(12) United States Patent
Tanaka et al.

(10) Patent No.: US 9,096,736 B2
(45) Date of Patent: Aug. 4, 2015

(54) FINE GRAPHITE PARTICLES, GRAPHITE PARTICLE-DISPERSED LIQUID CONTAINING THE SAME, AND METHOD FOR PRODUCING FINE GRAPHITE PARTICLES

(75) Inventors: Hiromitsu Tanaka, Aichi-gun (JP); Makoto Kato, Chita (JP); Osamu Watanabe, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 170 days.

(21) Appl. No.: 13/702,548

(22) PCT Filed: Jun. 7, 2011

(86) PCT No.: PCT/JP2011/063037
§ 371 (c)(1),
(2), (4) Date: Jan. 23, 2013

(87) PCT Pub. No.: WO2011/155486
PCT Pub. Date: Dec. 15, 2011

(65) Prior Publication Data
US 2013/0123415 A1 May 16, 2013

(30) Foreign Application Priority Data

Jun. 7, 2010 (JP) ................. 2010-129652
Apr. 28, 2011 (JP) ................. 2011-101958

(51) Int. Cl.
| | |
|---|---|
| C08K 3/04 | (2006.01) |
| C08L 33/26 | (2006.01) |
| C08L 79/08 | (2006.01) |
| C01B 31/04 | (2006.01) |
| C08L 33/14 | (2006.01) |
| C08L 53/00 | (2006.01) |
| C08L 79/04 | (2006.01) |
| C08K 9/08 | (2006.01) |
| C09C 1/46 | (2006.01) |
| C09C 3/10 | (2006.01) |

(52) U.S. Cl.
CPC . C08K 3/04 (2013.01); C01B 31/04 (2013.01); C08K 9/08 (2013.01); C08L 33/14 (2013.01); C08L 33/26 (2013.01); C08L 53/00 (2013.01); C08L 79/04 (2013.01); C08L 79/08 (2013.01); C09C 1/46 (2013.01); *C01P 2002/82* (2013.01); *C01P 2002/85* (2013.01); *C01P 2004/02* (2013.01); *C01P 2004/03* (2013.01); *C01P 2004/20* (2013.01); *C01P 2006/40* (2013.01); C09C 3/10 (2013.01); *Y10T 428/2998* (2015.01)

(58) Field of Classification Search
USPC ................. 524/529, 555, 548, 558
See application file for complete search history.

(56) References Cited

U.S. PATENT DOCUMENTS

| | | |
|---|---|---|
| 4,557,974 A | 12/1985 | Tsukuda et al. |
| 6,110,994 A | 8/2000 | Cooke et al. |
| 6,927,250 B2 | 8/2005 | Kaschak et al. |
| 7,914,844 B2 | 3/2011 | Stankovich et al. |
| 2002/0022122 A1 | 2/2002 | Hirata et al. |
| 2003/0180597 A1 | 9/2003 | Sakamoto et al. |
| 2006/0035081 A1 | 2/2006 | Morita et al. |
| 2007/0228339 A1 | 10/2007 | Fujiwara et al. |
| 2009/0146112 A1 | 6/2009 | Yokouchi |
| 2010/0147188 A1 | 6/2010 | Mamak et al. |
| 2010/0163795 A1 | 7/2010 | Kim et al. |
| 2011/0152435 A1 | 6/2011 | Morishita et al. |
| 2013/0096247 A1 | 4/2013 | Takahashi et al. |
| 2013/0143998 A1 | 6/2013 | Tanaka |

FOREIGN PATENT DOCUMENTS

| | | |
|---|---|---|
| JP | A-59-096142 | 6/1984 |
| JP | B2-62-15119 | 4/1987 |
| JP | A-2-204317 | 8/1990 |
| JP | A-10-330108 | 12/1998 |
| JP | A-2002-53313 | 2/2002 |
| JP | A-2002-508422 | 3/2002 |
| JP | A-2003-012311 | 1/2003 |
| JP | A-2003-176116 | 6/2003 |
| JP | A-2003-253127 | 9/2003 |
| JP | A-2003-268245 | 9/2003 |
| JP | 2004-134515 | * 4/2004 |
| JP | A-2004-134515 | 4/2004 |
| JP | A-2005-53773 | 3/2005 |

(Continued)

OTHER PUBLICATIONS

Stankovich et al., "Stable aqueous dispersions of graphitic nanoplatelets via the reduction of exfoliated graphite oxide in the presence of poly(sodium 4-styrenesulfonate)," *Journal of Materials Chemistry*, 2006, vol. 16, pp. 155-158.

Kurokawa et al., "Dispersion and Coating Film Characteristics of Graphite Particles Adsorbed with Polymers," *Material Technology*, 2002, vol. 20, No. 4, pp. 165-172 and 228 (with abstract).

Sato et al., "Polymer Encapsulation of Exfoliated Graphite by Polymerization of Styrene in Water," *Polymer Preprints*, 1999, vol. 48, No. 2, p. 145.

Wissert et al., "Graphene Nanocomposites Prepared From Blends of Polymer Latex with Chemically Reduced Graphite Oxide Dispersions," *Macromolecular Materials and Engineering*, 2010, vol. 295, pp. 1107-1115.

(Continued)

*Primary Examiner* — Robert Harlan
(74) *Attorney, Agent, or Firm* — Oliff PLC

(57) ABSTRACT

Fine graphite particles include plate-like graphite particles; and an aromatic vinyl copolymer which is adsorbed on the plate-like graphite particles, and which contains a vinyl aromatic monomer unit represented by the following formula (1):

$$—(CH_2—CHX)— \qquad (1)$$

(in the formula (1), X represents a phenyl group, a naphthyl group, an anthracenyl group, or a pyrenyl group, provided that these groups may have each a substituent).

16 Claims, 13 Drawing Sheets

(56) References Cited

FOREIGN PATENT DOCUMENTS

| JP | A-2005-281448 | | 10/2005 |
|---|---|---|---|
| JP | 2005-320220 | * | 11/2005 |
| JP | A-2005-320220 | | 11/2005 |
| JP | A-2006-033024 | | 2/2006 |
| JP | A-2006-111731 | | 4/2006 |
| JP | A-2006-144201 | | 6/2006 |
| JP | A-2006-233017 | | 9/2006 |
| JP | A-2007-002231 | | 1/2007 |
| JP | A-2007-005547 | | 1/2007 |
| JP | A-2007-291346 | | 11/2007 |
| JP | A-2008-179741 | | 8/2008 |
| JP | A-2009-29677 | | 2/2009 |
| JP | A-2009-144000 | | 7/2009 |
| JP | A-2009-155628 | | 7/2009 |
| JP | A-2009-242209 | | 10/2009 |
| JP | A-2010-037537 | | 2/2010 |
| JP | 2010-100837 | * | 5/2010 |
| JP | A-2010-100837 | | 5/2010 |
| JP | A-2010-155993 | | 7/2010 |
| JP | B2-4945419 | | 6/2012 |
| JP | A-2013-119576 | | 6/2013 |
| WO | WO 02/01660 A1 | | 1/2002 |
| WO | WO 2007/039435 | | 4/2007 |
| WO | WO 2009/075322 A1 | | 6/2009 |
| WO | WO 2009/106507 A2 | | 9/2009 |
| WO | 2011/158906 A1 | | 12/2011 |
| WO | WO 2011/155486 A1 | | 12/2011 |
| WO | WO 2011/155487 A1 | | 12/2011 |

OTHER PUBLICATIONS

Sep. 13, 2011 International Search Report issued in International Patent Application No. PCT/JP2011/063037 (with translation).
Jan. 17, 2013 International Preliminary Report on Patentability issued in International Patent Application No. PCT/JP2011/063037 (with translation).
Zhang et al., "Flammability and thermal stability studies of styrene-butyl acrylate copolymer/graphite oxide nanocomposite," Polymer Degradation and Stability, vol. 85 (2004), pp. 583-588.
Japanese Office Action dated Dec. 25, 2013 issued in Japanese Patent Application No. 2011-127081 (with translation).
Japanese Office Action dated Dec. 27, 2013 issued in Japanese Patent Application No. 2011-267228 (with translation).
Oct. 23, 2013 Japanese Office Action issued in Japanese Patent Application No. JP 2011-021562 (with partial translation).
U.S. Appl. No. 13/701,768, filed Apr. 11, 2013 in the name of Tanaka et al.
U.S. Appl. No. 13/705,765, filed Dec. 5, 2012 in the name of Tanaka.
Apr. 5, 2013 Supplemental Office Action issued in U.S. Appl. No. 13/705,765.
Nov. 8, 2013 Office Action issued in U.S. Appl. No. 13/705,765.
Mar. 28, 2013 Office Action issued in U.S. Appl. No. 13/705,765.
Sep. 13, 2011 International Search Report issued in International Patent Application No. PCT/JP2011/063038.
Jan. 17, 2013 translation of International Preliminary Report on Patentability issued in International Patent Application No. PCT/JP2011/063038.
Nov. 2, 2014 Office Action issued in Chinese Application No. 201180038223.1.
Japanese Office Action dated Sep. 11, 2014 issued in Japanese Patent Application No. 2011-127081 (with translation).
Japanese Office Action dated Jul. 14, 2014 issued in Japanese Patent Application No. 2011-021562 (with translation).
Zhang et al., "Preparation, Characterization, and Thermal Properties of Polystyrene-block-Quaternized Poly(4-vinylpyridine)/Montmorillonite Nanocomposites," Journal of Applied Polymer Science, vol. 102, pp. 1950-1958, 2006.
Uhl et al., "Formation of nanocomposites of styrene and its copolymers using graphite as the nanomaterial," Polymers for Advanced Technologies, vol. 16, pp. 533-540, 2005.
Office Action dated Dec. 26, 2014 issued in U.S. Appl. No. 13/701,768.
Chinese Office Action dated Sep. 22, 2014 issued in Chinese Patent Application No. 201180028215.9 (with translation).
Mar. 26, 2015 Office Action issued in Japanese Patent Application No. 2011-127083.

* cited by examiner (A) (B) (C)

FINE GRAPHITE PARTICLES, GRAPHITE PARTICLE-DISPERSED LIQUID CONTAINING THE SAME, AND METHOD FOR PRODUCING FINE GRAPHITE PARTICLES

TECHNICAL FIELD

The present invention relates to fine graphite particles, a graphite particle-dispersed liquid containing the same, and methods for producing the fine graphite particles and the graphite particle-dispersed liquid.

BACKGROUND ART

Graphite particles have various excellent characteristics such as excellent heat resistance, chemical resistance, mechanical strength, thermal conductivity, and electrical conductivity, as well as lubricity and light weight. In various fields, the characteristics of graphite particles are imparted to resin-formed articles and the like by dispersing graphite particles in a resin. However, graphite particles are easily aggregated, have a low affinity for resins or solvents, and hence are dispersed in a resin or a solvent in an aggregated state. When graphite particles in such an aggregated state are dispersed in a resin or a solvent, the characteristics tend to be expressed insufficiently.

For this reason, various methods for preparing fine graphite particles have been proposed so far in order to highly disperse graphite particles in a resin or a solvent. For example, Japanese Unexamined Patent Application Publication No. Hei 2-204317 (PTL 1) discloses a method for preparing a fine graphite by dry-grinding a graphite powder with a vibration mill. Although graphite particles become fine, such a mechanical process has a problem that the structure of the graphite is destroyed, and hence the electrical conductivity, thermal conductivity, and mechanical strength of the obtained fine graphite particles are lowered.

Japanese Unexamined Patent Application Publication No. 2005-53773 (PTL 2) discloses a method for preparing thin film-shaped graphite oxide particles by oxidizing graphite. Moreover, Japanese Unexamined Patent Application Publication No. 2009-242209 (PTL 3) discloses a method for organically modifying a graphite by ion-exchange a cation on a surface of a surface-oxidized graphite obtained by subjecting the graphite to an oxidation treatment for a cationic organic compound. According to these methods, graphite oxide particles can be obtained which can be highly dispersed in a resin or a solvent, and the characteristics of graphite can be imparted to a resin or the like by dispersing such graphite oxide particles in the resin.

However, the characteristics of fine graphite particles obtained by oxidation tend to be degraded as compared with the characteristics of the graphite particles used as the raw material, and such fine graphite particles still have room for improvement in terms of sufficient expression of original characteristics of graphite.

CITATION LIST

Patent Literature

[PTL 1] Japanese Unexamined Patent Application Publication No. Hei 2-204317
[PTL 2] Japanese Unexamined Patent Application Publication No. 2005-53773
[PTL 3] Japanese Unexamined Patent Application Publication No. 2009-242209

SUMMARY OF INVENTION

Technical Problem

The present invention has been made in view of the problems of the above-described conventional technologies, and objects of the present invention are to provide fine graphite particles which can be highly dispersed in a solvent or a resin, and which have characteristics superior to those of fine graphite particles obtained by oxidation, and to provide a production method thereof.

Solution to Problem

The present inventors have conducted earnest study in order to achieve the above object. As a result, the present inventors have found that fine graphite particles which can be highly dispersed in a solvent or a resin, are excellent in dispersion stability, and further exhibit electrical conductivity superior to that of fine graphite particles obtained by oxidation can be obtained by mixing graphite particles, a specific aromatic vinyl copolymer, and a peroxyhydrate, and subjecting the mixture to a grinding treatment. This finding has led to the completion of the present invention. Moreover, the present inventors have found that the dispersion stability of the fine graphite particles in a hydrophobic solvent is further improved by introducing at least one hydrocarbon chain of alkyl chains, oligoolefin chains, and polyolefin chains into the aromatic vinyl copolymer. This finding has led to the completion of the present invention.

Specifically, fine graphite particles of the present invention comprise:

plate-like graphite particles; and
an aromatic vinyl copolymer which is adsorbed on the plate-like graphite particles, and which contains a vinyl aromatic monomer unit represented by the following formula (1):

$$-(CH_2-CHX)- \qquad (1)$$

(in the formula (1), X represents a phenyl group, a naphthyl group, an anthracenyl group, or a pyrenyl group, provided that these groups may have each a substituent). Moreover, a graphite particle-dispersed liquid of the present invention comprises: a solvent; and the fine graphite particles of the present invention dispersed in the solvent.

In such fine graphite particles and such a graphite particle-dispersed liquid, the aromatic vinyl copolymer preferably comprises the vinyl aromatic monomer unit, and another monomer unit derived from at least one monomer selected from the group consisting of (meth)acrylic acid, (meth)acrylates, (meth)acrylamides, vinylpyridines, maleic anhydride, and maleimides. Moreover, the aromatic vinyl copolymer is preferably a block copolymer.

In the fine graphite particles and the graphite particle-dispersed liquid of the present invention, the plate-like graphite particles preferably have thicknesses of 0.3 to 1000 nm. Moreover, at least one functional group selected from the group consisting of hydroxyl group, carboxyl group, and epoxy group is preferably bonded to 50% or less of all carbon atoms near a surface of the plate-like graphite particle.

In addition, the fine graphite particles of the present invention may further comprise at least one hydrocarbon chain which is bonded to the aromatic vinyl copolymer, and which is selected from the group consisting of alkyl chains, oligoolefin chains, and polyolefin chains. In the fine graphite particles, it is preferable that the aromatic vinyl copolymer has a functional group, and that the hydrocarbon chain is formed by bonding between the functional group and at least one selected from alkyl compounds, oligoolefins, and polyolefins which each have a moiety reactive with the functional group of the aromatic vinyl copolymer. The functional group is preferably an amino group, and the moiety reactive with the functional group is preferably at least one selected from the group consisting of a chlorine atom, a carboxyl group, and a carboxylic anhydride group.

In the graphite particle-dispersed liquid of the present invention, when the solvent is a hydrophobic solvent, in the fine graphite particles, the aromatic vinyl copolymer to which at least one hydrocarbon chain selected from the group consisting of alkyl chains, oligoolefin chains, and polyolefin chains is bonded is preferably adsorbed on the plate-like graphite particles.

A method for producing fine graphite particles of the present invention comprises:

a mixing step of mixing graphite particles, an aromatic vinyl copolymer, a peroxyhydrate and a solvent, the aromatic vinyl copolymer containing a vinyl aromatic monomer unit represented by the following formula (1):

$$—(CH_2—CHX)— \quad (1)$$

(in the formula (1), X represents a phenyl group, a naphthyl group, an anthracenyl group, or a pyrenyl group, provided that these groups may have each a substituent); and a grinding step of subjecting the mixture obtained in the mixing step to a grinding treatment.

The peroxyhydrate is preferably a complex of hydrogen peroxide with a compound having a carbonyl group. Meanwhile, the grinding treatment is preferably an ultrasonic wave treatment or a wet grinding treatment.

Moreover, the method for producing fine graphite particles of the present invention may further comprise a hydrocarbon chain introduction step of mixing the fine graphite particles obtained in the grinding step with at least one selected from alkyl compounds, oligoolefins, and polyolefins which each have a moiety reactive with the functional group, and bonding between the aromatic vinyl copolymer and at least one selected from the alkyl compounds, the oligoolefins, and the polyolefins, to thereby introduce at least one selected from the group consisting of alkyl chains, oligoolefin chains, and polyolefin chains. In this case, the aromatic vinyl copolymer preferably has a functional group. In addition, the functional group is preferably an amino group, and the moiety reactive with the functional group is preferably at least one selected from the group consisting of a chlorine atom, a carboxyl group, and a carboxylic anhydride group.

Note that although it is not exactly clear why the fine graphite particles of the present invention are excellent in dispersion stability, the present inventors presume as follows. Specifically, graphite particles intrinsically less interact with solvents or resins, and are easily aggregated. Hence, graphite particles are difficult to highly disperse in a solvent or a resin. On the other hand, it is presumed that since the aromatic vinyl copolymer is adsorbed on the fine plate-like graphite particles in the fine graphite particles of the present invention, the cohesive force between the plate-like graphite particles is reduced, and the dispersibility in a solvent or a resin is improved. Further, it is presumed that the dispersion stability of the fine graphite particles is also improved, because the adsorption ability of the aromatic vinyl copolymer is stable.

Moreover, although it is not exactly clear why the dispersion stability of the fine graphite particles in a hydrophobic solvent is further improved by introducing at least one hydrocarbon chain of alkyl chains, oligoolefin chains, and polyolefin chains into the aromatic vinyl copolymer according to the present invention, the present inventors presumes as follows. Specifically, it is presumed that the surfaces of the fine graphite particles are alkylated by bonding at least one of alkyl compounds, oligoolefins, and polyolefins to the aromatic vinyl copolymer adsorbed on the plate-like graphite particles, to thereby introduce at least one hydrocarbon chain of alkyl chains, oligoolefin chains, and polyolefin chains thereinto. It is presumed that the dispersion stability in a hydrophobic solvent is further improved because the fine graphite particles having each the alkylated surface have an improved affinity for hydrophobic solvents.

Further, although it is not exactly clear why the fine graphite particles of the present invention exhibit electrical conductivity superior to that of fine graphite particles obtained by oxidation, the present inventors presumes as follows. Specifically, it is presumed that the original characteristics of the graphite are expressed as they are, because the graphite structure is retained in the fine graphite particles of the present invention. On the other hand, when fine graphite particles are prepared by oxidation, the graphite particles can become sufficiently fine by oxidizing not only the surface of the graphite particle, but also the inside thereof. However, when the inside of graphite particle is oxidized, the graphite structure tends to be partially destructed, as the particles become finer. Presumably for this reason, characteristics attributable to the graphite structure, for example, the original characteristics of graphite such as electrical conductivity, thermal conductivity, and mechanical strength, deteriorate in the fine graphite particles obtained by oxidation.

Advantageous Effects of Invention

According to the present invention, it is possible to obtain fine graphite particles which can be highly dispersed in a solvent or a resin, are excellent in dispersion stability, and further exhibit electrical conductivity superior to that of fine graphite particles obtained by oxidation, as well as a graphite particle-dispersed liquid containing the same. In particular, it is possible to further improve dispersion stability in a hydrophobic solvent by fine graphite particles comprising at least one hydrocarbon chain, which is bonded to an aromatic vinyl copolymer, of alkyl chains, oligoolefin chains, and polyolefin chains.

DESCRIPTION OF EMBODIMENTS

Figure 1:
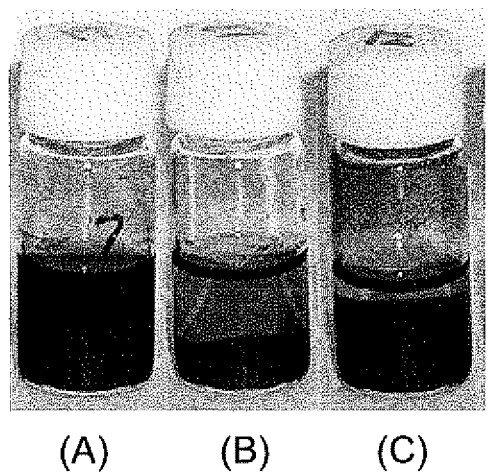
FIG. 1 Parts (A) to (C) of FIG. 1 are photographs showing dispersion states of graphite particles in graphite particle-dispersed liquids obtained in Example 1, and Comparative Examples 2 and 6, respectively.

Hereinafter, the present invention will be described in detail on the basis of preferred embodiments thereof.

First, fine graphite particles of the present invention are described. The fine graphite particles of the present invention comprise plate-like graphite particles, and an aromatic vinyl copolymer adsorbed on the plate-like graphite particles. In addition, the fine graphite particles of the present invention may further comprise at least one hydrocarbon chain, which is bonded to the aromatic vinyl copolymer, of alkyl chains, oligoolefin chains, and polyolefin chains.

The plate-like graphite particles constituting the fine graphite particles of the present invention are not particularly limited, but can be obtained by grinding known graphite having a graphite structure (synthetic graphite or natural graphite (for example, flake graphite, vein graphite, or amorphous graphite)), while avoiding destruction of the graphite structure.

The thickness of the plate-like graphite particle is not particularly limited, but is preferably 0.3 to 1000 nm, more preferably 0.3 to 100 nm, and particularly preferably 1 to 100 nm. Meanwhile, the size of the plate-like graphite particle in the plane direction is not particularly limited, but, for example, the length in the major axis direction (longest diameter) is preferably 0.1 to 500 µm, and more preferably 1 to 500 µm, while the length in the minor axis direction (shortest diameter) is preferably 0.1 to 500 µm, and more preferably 0.3 to 100 µm.

Moreover, a functional group such as hydroxyl group, carboxyl group, or epoxy group is preferably bonded (more preferably covalently bonded) to surfaces of the plate-like graphite particles according to the present invention. The functional group has affinity for the aromatic vinyl copolymer according to the present invention, and increases the amount of the aromatic vinyl copolymer adsorbed on the plate-like graphite particles, so that the dispersibility of the fine graphite particles of the present invention in a solvent or a resin tends to increase.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. On the other hand, the lower limit of the ratio of the carbon atoms to which the functional group is bonded is not particularly limited, but is preferably 0.01% or higher. Note that the functional group such as hydroxyl group can be quantitatively measured by the X-ray photoelectron spectroscopy (XPS), and the amount of the functional group present in a region from a particle surface to a depth of 10 nm can be determined. Here, when the thickness of a plate-like graphite particle is 10 nm or less, the amount of the functional group present in the entire region of the plate-like graphite particle is measured.

The aromatic vinyl copolymer constituting the fine graphite particles of the present invention contains a vinyl aromatic monomer unit represented by the following formula (1):

$$—(CH_2—CHX)— \quad (1)$$

(in the formula (1), X represents a phenyl group, a naphthyl group, an anthracenyl group, or a pyrenyl group, provided that these groups may have each a substituent); and another monomer unit.

In such an aromatic vinyl copolymer, the vinyl aromatic monomer unit exhibits an ability to adsorb on the graphite particles, and the other monomer unit exhibits affinity for solvents or resins, and for the functional group near the surface of the graphite particle. Hence, such an aromatic vinyl copolymer reduces the cohesive force between the plate-like graphite particles by adsorbing on the plate-like graphite particles, and also imparts affinity for solvents or resins to the plate-like graphite particles, so that the plate-like graphite particles can be highly dispersed in a solvent or a resin.

Moreover, since the vinyl aromatic monomer unit easily adsorbs on the graphite particles as described above, a copolymer having a higher content of the vinyl aromatic monomer unit is adsorbed in a larger amount on the plate-like graphite particles, so that the dispersibility of the fine graphite particles of the present invention in a solvent or a resin tends to be increased. The amount of the vinyl aromatic monomer unit is preferably 10 to 98% by mass, more preferably 30 to 98% by mass, and particularly preferably 50 to 95% by mass, relative to the entire aromatic vinyl copolymer. If the amount of the vinyl aromatic monomer unit is less than the lower limit, the amount of the aromatic vinyl copolymer adsorbed on the plate-like graphite particles decreases, so that the dispersibility of the fine graphite particles tends to be lowered. If the amount of the vinyl aromatic monomer unit exceeds the upper limit, the affinity for a solvent or a resin is not imparted to the plate-like graphite particles, so that the dispersibility of the fine graphite particles tends to be lowered.

Examples of the substituent which the group represented by X in the above-described formula (1) may have include an amino group, a carboxyl group, carboxylic acid ester groups, a hydroxyl group, amide groups, imino groups, a glycidyl group, alkoxy groups (for example, a methoxy group), a carbonyl group, imide groups, phosphate ester groups, and the like. Of these substituents, alkoxy groups such as a methoxy group are preferable, and a methoxy group is more preferable from the viewpoint that the dispersibility of the fine graphite particles is improved.

Examples of the vinyl aromatic monomer unit include a styrene monomer unit, a vinylnaphthalene monomer unit, a vinylanthracene monomer unit, a vinylpyrene monomer unit, a vinylanisole monomer unit, a vinylbenzoic acid ester monomer unit, an acetylstyrene monomer unit, and the like. Of these vinyl aromatic monomer units, a styrene monomer unit, a vinylnaphthalene monomer unit, and a vinylanisole monomer unit are preferable from the viewpoint that the dispersibility of the fine graphite particles is improved.

The other monomer unit constituting the aromatic vinyl copolymer according to the present invention is not particularly limited, but is preferably a monomer unit derived from at least one monomer selected from the group consisting of (meth)acrylic acid, (meth)acrylates, (meth)acrylamides, vinylimidazoles, vinylpyridines, maleic anhydride, and maleimides. The use of such an aromatic vinyl copolymer containing the other monomer unit improves the affinity of the fine graphite particles for solvents or resins, thereby making it possible to highly disperse the fine graphite particles in a solvent or a resin.

Examples of the (meth)acrylates include alkyl(meth)acrylates, substituted alkyl(meth)acrylates (for example, hydroxyalkyl(meth)acrylates and aminoalkyl(meth)acrylates), and the like. Examples of the (meth)acrylamides include (meth)acrylamide, N-alkyl(meth)acrylamides, N,N-dialkyl(meth)acrylamides, and the like.

Examples of the vinylimidazoles include 1-vinylimidazole and the like. Examples of the vinylpyridines include 2-vinylpyridine, 4-vinylpyridine, and the like. Examples of the maleimides include maleimide, alkylmaleimides, arylmaleimides, and the like.

Of these other monomers, alkyl(meth)acrylates, hydroxyalkyl(meth)acrylates, aminoalkyl(meth)acrylates, N,N-dialkyl(meth)acrylamides, 2-vinylpyridine, 4-vinylpyridine, and arylmaleimides are preferable, hydroxyalkyl(meth)acrylates, N,N-dialkyl(meth)acrylamides, 2-vinylpyridine, and arylmaleimides are more preferable, and phenylmaleimide is particularly preferable from the viewpoint that the dispersibility of the fine graphite particles is improved.

The number average molecular weight of the aromatic vinyl copolymer in the fine graphite particles of the present invention is not particularly limited, but is preferably 1000 to 1000000, and more preferably 5000 to 100000. If the number average molecular weight of the aromatic vinyl copolymer is less than the lower limit, the adsorption capability on the graphite particles tends to decrease. Meanwhile, if the number average molecular weight of the aromatic vinyl copolymer exceeds the upper limit, the handling tends to be difficult, because the solubility in a solvent decreases, or the viscosity remarkably increases. Note that the number average molecular weight of the aromatic vinyl copolymer is a value measured by gel permeation chromatography (column: Shodex GPC K-805L and Shodex GPC K-800RL (both manufactured by Showa Denko K. K.), eluent: chloroform), and converted by using standard polystyrene.

In addition, a random copolymer or a block copolymer may be used as the aromatic vinyl copolymer in the fine graphite particles of the present invention. From the viewpoint that the dispersibility of the fine graphite particles is improved, a block copolymer is preferably used.

The amount of the aromatic vinyl copolymer in the fine graphite particles of the present invention is preferably $10^{-7}$ to $10^{-1}$ parts by mass, and more preferably $10^{-5}$ to $10^{-2}$ parts by mass, relative to 100 parts by mass of the plate-like graphite particles. If the amount of the aromatic vinyl copolymer is less than the lower limit, the dispersibility of the fine graphite particles tends to be lowered, because the aromatic vinyl copolymer is adsorbed insufficiently on the plate-like graphite particles. Meanwhile, if the amount of the aromatic vinyl copolymer exceeds the upper limit, part of the aromatic vinyl copolymer tends to be present without direct adsorption on the plate-like graphite particles.

Moreover, the fine graphite particles of the present invention may further comprise at least one hydrocarbon chain, which is bonded to the aromatic vinyl copolymer, of alkyl chains, oligoolefin chains, and polyolefin chains. Such fine graphite particles tend to exhibit an excellent dispersion stability in a hydrophobic solvent, because a surface of the fine graphite particle is alkylated with the hydrocarbon chain. Moreover, such an alkyl chain, an oligoolefin chain, or a polyolefin chain is preferably bonded to a side chain of the aromatic vinyl copolymer. Thereby, the affinity of the fine graphite particles for a hydrophobic solvent tends to be further improved.

In such fine graphite particles, the alkyl chains, the oligoolefin chains, and the polyolefin chains are preferably those each formed by reacting the aromatic vinyl copolymer having a functional group with an alkyl compound, oligoolefin, or polyolefin having a moiety reactive with the functional group (hereinafter, referred to as a "reactive moiety"), and bonding the reactive moiety of the alkyl compound, oligoolefin, or polyolefin to the functional group of the aromatic vinyl copolymer.

Examples of the functional group include an amino group, a carboxyl group, carboxylic acid ester groups, a hydroxyl group, amide groups, imino groups, a glycidyl group, and the like, and an amino group is preferable from the viewpoint of a high reactivity with the reactive moiety. Meanwhile, examples of the reactive moiety include halogen atoms (such as a chlorine atom, a bromine atom, and an iodine atom), a carboxyl group, carboxylic anhydride groups (such as a maleic anhydride group), a sulfonic acid group, an aldehyde group, a glycidyl group, and the like. From the viewpoint of a high reactivity with the functional group, halogen atoms, a carboxyl group, and carboxylic anhydride groups are preferable, halogen atoms are more preferable, and a chlorine atom is further preferable. Further, the combination of the functional group with the reactive moiety is preferably a combination of an amino group with a halogen atom or a combination of an amino group with a carboxyl group or a carboxylic anhydride group, more preferably a combination of an amino group with a chlorine atom or a combination of an amino group with a maleic anhydride group, and particularly preferably a combination of an amino group with a chlorine atom, from the viewpoint that the reactivity therebetween is high.

Examples of the aromatic vinyl copolymer having the functional group include those having the functional group in at least one of the vinyl aromatic monomer unit and the other monomer unit. From the viewpoint of not impairing the ability to adsorb on the plate-like graphite particles, the other monomer unit preferably has the functional group. From the viewpoint that an alkyl chain, an oligoolefin chain, or a polyolefin chain can be easily introduced, the other monomer unit is more preferably another vinyl monomer unit having the functional group.

The other vinyl monomer unit having the functional group is not particularly limited, but is preferably a functional group-containing vinyl monomer unit derived from at least one vinyl monomer having the functional group selected from the group consisting of (meth)acrylic acid, (meth)acrylates, (meth)acrylamides, vinylimidazoles, and vinylpyridines. The use of an aromatic vinyl copolymer containing the other vinyl monomer unit having a functional group makes it possible to easily introduce an alkyl chain, an oligoolefin chain, or a polyolefin chain into the aromatic vinyl copolymer. In addition, the affinity of the obtained fine graphite particles for solvents or resins is improved, so that the fine graphite particles can be highly dispersed in a solvent or a resin.

Examples of the other vinyl monomer having an amino group include aminoalkyl(meth)acrylates, vinylpyridines (for example, 2-vinylpyridine and 4-vinylpyridine), vinylimidazoles (for example, 1-vinylimidazole), and the like. An example of the other vinyl monomer having a carboxyl group is (meth)acrylic acid. Examples of the other vinyl monomer having a carboxylic acid ester group include alkyl(meth)acrylates. Examples of the other vinyl monomer having a hydroxyl group include hydroxyalkyl(meth)acrylates. Examples of the other vinyl monomer having an amide group include (meth)acrylamide, N-alkyl(meth)acrylamides, N,N-dialkyl(meth)acrylamides, and the like.

Of these other vinyl monomers having a functional group, hydroxyalkyl(meth)acrylates, aminoalkyl(meth)acrylates, N,N-dialkyl(meth)acrylamides, 2-vinylpyridine, and 4-vinylpyridine are preferable, aminoalkyl(meth)acrylates, 2-vinylpyridine, and 4-vinylpyridine are more preferable, and 2-vinylpyridine is particularly preferable, from the viewpoint that an alkyl chain, an oligoolefin chain, or a polyolefin chain can be easily introduced into the aromatic vinyl copolymer.

The alkyl compound, oligoolefin, and polyolefin each having the reactive moiety which is to be bonded to such an aromatic vinyl copolymer having a functional group are not particularly limited, but are preferably an alkyl compound, oligoolefin, and polyolefin each having the functional group at a terminal of the molecule (hereinafter, referred to as a "terminal functional group-containing alkyl compound", a "terminal functional group-containing oligoolefin" and a "terminal functional group-containing polyolefin," respectively). Such a terminal functional group-containing alkyl compound, a terminal functional group-containing oligoolefin, and a terminal functional group-containing polyolefin are reactive with the aromatic vinyl copolymer having the functional group, and hence the alkyl chain, oligoolefin chain, or polyolefin chain can be easily introduced into the aromatic vinyl copolymer.

Specific examples of the alkyl compounds, oligoolefins, and polyolefins each having the reactive moiety include chlorinated products, brominated products, hydroxyl group-containing products, maleic acid-modified products, and (meth) acrylic acid-modified products of alkyl compounds, oligoolefins, and polyolefins, and the like. Of these examples, products chlorinated at a terminal and products containing a terminal hydroxyl group are preferable, and products chlorinated at a terminal are more preferable. The kinds of the oligoolefin and polyolefin are not particularly limited, but an ethylene oligomer, polyethylene, a propylene oligomer, polypropylene, and an ethylene-propylene copolymer (an oligomer and a polymer) are preferable from the viewpoint that the oligoolefin chain or the polyolefin chain is easily introduced.

The number average molecular weight of such a polyolefin having the reactive moiety is not particularly limited, but is preferably 100 to 1000000, and more preferably 1000 to 10000. If the number average molecular weight of the polyolefin is less than the lower limit, the introduced polyolefin chain is so short that the affinity of the fine graphite particles for a hydrophobic solvent tends to be improved insufficiently. Meanwhile, if the number average molecular weight of the polyolefin exceeds the upper limit, the polyolefin chain tends to be difficult to introduce, because the polyolefin is not bonded to the aromatic vinyl copolymer easily. Likewise, the molecular weight of the alkyl compound having the reactive moiety is not particularly limited, but is preferably 70 to 500. In addition, the number average molecular weight of the oligoolefin having the reactive moiety is not particularly limited, but is preferably 100 to 5000.

A graphite particle-dispersed liquid of the present invention contains such fine graphite particles highly dispersed in a solvent. The solvent used for the graphite particle-dispersed liquid of the present invention is not particularly limited, but preferred are dimethylformamide (DMF), chloroform, dichloromethane, chlorobenzene, dichlorobenzene, N-methylpyrrolidone (NMP), hexane, toluene, dioxane, propanol, γ-picoline, acetonitrile, dimethyl sulfoxide (DMSO), and dimethylacetamide (DMAC), and more preferred are dimethylformamide (DMF), chloroform, dichloromethane, chlorobenzene, dichlorobenzene, N-methylpyrrolidone (NMP), hexane, and toluene.

Moreover, when the solvent in the graphite particle-dispersed liquid of the present invention is a hydrophobic solvent, the fine graphite particles preferably comprise at least one hydrocarbon chain of the alkyl chains, the oligoolefin chains, and the polyolefin chains, from the viewpoint that the dispersion stability is further improved. The hydrophobic solvent is not particularly limited, but examples thereof include hexane, toluene, chloroform, dichloromethane, and the like. Of these hydrophobic solvents, toluene is preferable from the viewpoint that the fine graphite particles comprising the hydrocarbon chain are further highly dispersed.

The concentration of the fine graphite particle per liter of the solvent in the graphite particle-dispersed liquid of the present invention is preferably 0.1 to 200 g/L, and more preferably 1 to 100 g/L. If the concentration of the fine graphite particles is less than the lower limit, such an amount tends to be economically disadvantageous, because the amount of the solvent consumed increases. Meanwhile, if the concentration of the fine graphite particles exceeds the upper limit, the fluidity of the dispersion liquid tends to be lowered, because the viscosity of the dispersion liquid increases due to contact of the fine graphite particles with each other.

Next, methods for producing fine graphite particles and a graphite particle-dispersed liquid of the present invention are described. The method for producing fine graphite particles of the present invention comprises: mixing graphite particles which are a raw material, an aromatic vinyl copolymer containing a vinyl aromatic monomer unit represented by the above-described formula (1), a peroxyhydrate, and a solvent; subjecting the obtained mixture to a grinding treatment; and optionally further introducing at least one hydrocarbon chain of alkyl chains, oligoolefin chains, and polyolefin chains into the aromatic vinyl copolymer in the obtained fine graphite particles. In addition, this method makes it possible to obtain the fine graphite particles of the present invention in a state of being dispersed in a solvent, i.e., as the graphite particle-dispersed liquid of the present invention.

Examples of the graphite particles (hereinafter, referred to as "raw material graphite particles") used as a raw material in the methods for producing fine graphite particles and a graphite particle-dispersed liquid of the present invention include known graphite having a graphite structure (synthetic graphite and natural graphite (for example, flake graphite, vein graphite, and amorphous graphite)). In particular, preferred are those from which plate-like graphite particles having the thickness in the above-described range can be obtained by grinding. The particle diameter of the raw material graphite particle is not particularly limited, but is preferably 0.01 to 5 mm, but more preferably 0.1 to 1 mm.

Moreover, it is preferable that a functional group such as hydroxyl group, carboxyl group, or epoxy group be bonded (preferably covalently bonded) to each surface of the plate-like graphite particles constituting the raw material graphite particles. The functional group has affinity for the aromatic vinyl copolymer, and increases the amount of the aromatic vinyl copolymer adsorbed on the plate-like graphite particles, so that the obtained fine graphite particles tend to have a high dispersibility in a solvent or a resin.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. Meanwhile, the lower limit of the ratio of the carbon atoms to which the functional group is bonded is not particularly limited, but is preferably 0.01% or higher.

Meanwhile, examples of the peroxyhydrate include complexes of hydrogen peroxide with a compound having a carbonyl group (for example, urea, a carboxylic acid (benzoic acid, salicylic acid, or the like), a ketone (acetone, methyl ethyl ketone, or the like), or a carboxylic acid ester (methyl benzoate, ethyl salicylate, or the like)); those in which hydrogen peroxide is coordinated to a compound such as a quaternary ammonium salt, potassium fluoride, rubidium carbonate, phosphoric acid, or uric acid; and the like. Such a peroxyhydrate acts as an oxidizing agent in the methods for producing fine graphite particles and a graphite particle-dispersed liquid of the present invention, and facilitates the exfoliation of carbon layers, without destruction of the graphite structure of the raw material graphite particles. In other words, the peroxyhydrate is intercalated between carbon layers, and causes the cleavage to proceed, while oxidizing the surfaces of the layers. Simultaneously, the aromatic vinyl copolymer is intercalated between the cleaved carbon layers to stabilize the cleavage surfaces. Thus, the interlayer exfoliation is promoted. Consequently, the aromatic vinyl copolymer is adsorbed on the surfaces of the plate-like graphite particles, making it possible to highly disperse the fine graphite particles in a solvent or a resin.

The solvent used in the methods for producing fine graphite particles and a graphite particle-dispersed liquid of the present invention is not particularly limited, but a solvent exemplified as the solvents used for the graphite particle-dispersed liquid of the present invention can be used.

In the methods for producing fine graphite particles and a graphite particle-dispersed liquid of the present invention, first, the raw material graphite particles, the aromatic vinyl copolymer, the peroxyhydrate, and the solvent are mixed (a mixing step). The amount of the raw material graphite particles mixed per liter of the solvent is preferably 0.1 to 500 g/L, and more preferably 10 to 200 g/L. If the amount of the raw material graphite particles mixed is less than the lower limit, such an amount tends to be economically disadvantageous, because the amount of the solvent consumed increases. Meanwhile, if the amount of the raw material graphite particles mixed exceeds the upper limit, handling of the liquid tends to be difficult, because the viscosity of the liquid increases.

Meanwhile, the amount of the aromatic vinyl copolymer mixed is preferably 0.1 to 1000 parts by mass, and more preferably 0.1 to 200 parts by mass, relative to 100 parts by mass of the raw material graphite particles. If the amount of the aromatic vinyl copolymer mixed is less than the lower limit, the dispersibility of the obtained fine graphite particles tends to be lowered. Meanwhile, if the amount of the aromatic vinyl copolymer mixed exceeds the upper limit, handling of the liquid tends to be difficult, because the aromatic vinyl copolymer is not dissolved in the solvent, and the viscosity of the liquid increases.

Moreover, the amount of the peroxyhydrate mixed is preferably 0.1 to 500 parts by mass, and more preferably 1 to 100 parts by mass, relative to 100 parts by mass of the raw material graphite particles. If the amount of the peroxyhydrate mixed is less than the lower limit, the dispersibility of the obtained fine graphite particles tends to be lowered. Meanwhile, if the amount of the peroxyhydrate mixed exceeds the upper limit, the electrical conductivity of the obtained fine graphite particles tends to be lowered, because the raw material graphite particles are excessively oxidized.

Next, the mixture obtained in the mixing step is subjected to a grinding treatment, so that the raw material graphite particles are ground into plate-like graphite particles (a grinding step). As a result, the aromatic vinyl copolymer adsorbs on the surfaces of the produced plate-like graphite particles. Hence, a graphite particle-dispersed liquid comprising fine graphite particles having an excellent dispersion stability in a solvent or a resin can be obtained.

Examples of the grinding treatment according to the present invention include an ultrasonic wave treatment (the oscillation frequency is preferably 15 to 400 kHz, and the output power is preferably 500 W or less), a treatment using a ball mill, wet grinding, blasting, mechanical grinding, and the like. This grinding treatment makes it possible to grind the raw material graphite particles without destruction of the graphite structure of the raw material graphite particles to obtain the plate-like graphite particles. In addition, the temperature of the grinding treatment is not particularly limited, but may be −20 to 100° C., for example. Moreover, the grinding treatment time is not particularly limited, but may be 0.01 to 50 hours, for example.

In the methods for producing fine graphite particles and a graphite particle-dispersed liquid of the present invention, at least one hydrocarbon chain of alkyl chains, oligoolefin chains, and polyolefin chains is optionally introduced into the aromatic vinyl copolymer in the fine graphite particles by mixing the fine graphite particles obtained in the grinding step with at least one of the above-described alkyl compounds, oligoolefins, and polyolefins which each have the reactive moiety (a hydrocarbon chain introduction step). In this case, the aromatic vinyl copolymer has to have a functional group, and the at least one hydrocarbon chain of alkyl chains, oligoolefin chains, and polyolefin chains is introduced into the aromatic vinyl copolymer by bonding between this functional group and the reactive moiety.

In this hydrocarbon chain introduction step, the fine graphite particles obtained in the grinding step, at least one of the above-described alkyl compounds, oligoolefins, and polyolefins each having the reactive moiety, and a solvent are mixed, and if necessary, the obtained mixture is heated. Thus, the aromatic vinyl copolymer having the functional group and at least one of the alkyl compounds, the oligoolefins, and the polyolefins each having the reactive moiety are reacted with each other. The solvent is not particularly limited, but a solvent exemplified as the solvents used for the graphite particle-dispersed liquid of the present invention can be used. In addition, the reaction temperature is preferably −10 to 150° C., and the reaction time is preferably 0.1 to 10 hours.

The amount of the fine graphite particles mixed per liter of the solvent is preferably 1 to 200 g/L, and more preferably 1 to 50 g/L. If the amount of the fine graphite particles mixed is less than the lower limit, such an amount tends to be economically disadvantageous, because the amount of the solvent consumed increases. Meanwhile, if the amount of the fine graphite particles mixed exceeds the upper limit, handling of the liquid tends to be difficult, because the viscosity of the liquid increases.

Meanwhile, the amount of the alkyl compound, the oligoolefin, or the polyolefin having the reactive moiety mixed is preferably 0.001 to 500 parts by mass, and more preferably 10 to 500 parts by mass, relative to 100 parts by mass of the fine graphite particles. If the amount of the alkyl compound, the oligoolefin, or the polyolefin mixed is less than the lower limit, the amount of the alkyl chain, the oligoolefin chain, or the polyolefin chain introduced is so small that the dispersibility of the fine graphite particles in a hydrophobic solvent tends to be improved insufficiently. Meanwhile, if the amount of the alkyl compound, the oligoolefin, or the polyolefin mixed exceeds the upper limit, handling of the liquid tends to be difficult, because the viscosity of the liquid increases.

The thus obtained fine graphite particles of the present invention may be used in a state of the dispersion liquid as they are (in the state of the graphite particle-dispersed liquid of the present invention), or may be used after the solvent is removed by subjecting the obtained graphite particle-dispersed liquid to filtration, centrifugation, or the like. Further, the obtained fine graphite particles may be used as a graphite particle-dispersed liquid of the present invention after the obtained fine graphite particles are redispersed in a solvent.

EXAMPLES

Hereinafter, the present invention will be described more specifically on the basis of Examples and Comparative Examples. However, the present invention is not limited to Examples below. Note that the number average molecular weight (Mn) of each aromatic vinyl copolymer was measured by using a gel permeation chromatograph ("Shodex GPC101" manufactured by Showa Denko K. K.) under the following conditions.

<Conditions for Measurement of Aromatic Vinyl Copolymer>

Column: Shodex GPC K-805L and Shodex GPC K-800RL (both manufactured by Showa Denko K. K.)
Eluent: chloroform
Measuring temperature: 25° C.
Sample concentration: 0.1 mg/ml
Detection means: RI
Note that a value converted by using standard polystyrene is shown as the number average molecular weight (Mn) of each aromatic vinyl copolymer.

Example 1

0.67 g of styrene (ST), 1.23 g of N,N-dimethylmethacrylamide (DMMAA), 10 mg of azobisisobutyronitrile, and 5 ml of toluene were mixed, and a polymerization reaction was performed under a nitrogen atmosphere at 60° C. for 6 hours. After cooling, purification was performed by reprecipitation using chloroform-ether. Thus, 1.0 g of an ST-DMMAA (35:65) random copolymer was obtained. The ST-DMMAA (35:65) random copolymer had a number average molecular weight (Mn) of 78000.

20 mg of graphite particles ("EXP-P" manufactured by Nippon Graphite Industries, ltd., particle diameters: 100 to 600 μm), 80 mg of urea-hydrogen peroxide inclusion complex, 20 mg of the ST-DMMAA (35:65) random copolymer, and 2 ml of N,N-dimethylformamide (DMF) were mixed, and subjected to an ultrasonic wave treatment (output power: 250 W) at room temperature for 5 hours. Thus, a graphite particle-dispersed liquid was obtained.

Example 2

1.0 g of an ST-DMMAA (50:50) random copolymer (Mn=55000) was obtained in the same manner as in Example 1, except that the amount of styrene (ST) was changed to 1 g, and the amount of N,N-dimethylmethacrylamide (DMMAA) was changed to 1 g. A graphite particle-dispersed liquid was obtained in the same manner as in Example 1, except that 20 mg of this ST-DMMAA (50:50) random copolymer was used instead of the ST-DMMAA (35:65) random copolymer.

Example 3

1.0 g of an ST-DMMAA (65:35) random copolymer (Mn=67000) was obtained in the same manner as in Example 1, except that the amount of styrene (ST) was changed to 1.23 g, and the amount of N,N-dimethylmethacrylamide (DMMAA) was changed to 0.67 g. A graphite particle-dispersed liquid was obtained in the same manner as in Example 1, except that 20 mg of this ST-DMMAA (65:35) random copolymer was used instead of the ST-DMMAA (35:65) random copolymer.

Example 4

1.2 g of an ST-DMMAA (80:20) random copolymer (Mn=92000) was obtained in the same manner as in Example 1, except that the amount of styrene (ST) was changed to 1.6 g, and the amount of N,N-dimethylmethacrylamide (DMMAA) was changed to 0.4 g. A graphite particle-dispersed liquid was obtained in the same manner as in Example 1, except that 20 mg of this ST-DMMAA (80:20) random copolymer was used instead of the ST-DMMAA (35:65) random copolymer.

Example 5

0.27 g of a VN-DMMAA (30:70) random copolymer (Mn=17000) was obtained in the same manner as in Example 1, except that 0.6 g of 1-vinylnaphthalene (VN) was used instead of the styrene, and the amount of N,N-dimethylmethacrylamide (DMMAA) was changed to 1.4 g. A graphite particle-dispersed liquid was obtained in the same manner as in Example 1, except that 20 mg of this VN-DMMAA (30:70) random copolymer was used instead of the ST-DMMAA (35:65) random copolymer.

Example 6

0.39 g of a VA-DMMAA (30:70) random copolymer (Mn=28000) was obtained in the same manner as in Example 1, except that 0.6 g of 4-vinylanisole (VA) was used instead of the styrene, and the amount of N,N-dimethylmethacrylamide (DMMAA) was changed to 1.4 g. A graphite particle-dispersed liquid was obtained in the same manner as in Example 1, except that 20 mg of this VA-DMMAA (30:70) random copolymer was used instead of the ST-DMMAA (35:65) random copolymer.

Comparative Example 1

1.5 g of an ST (100) homopolymer (Mn=95000) was obtained in the same manner as in Example 1, except that 2 g of styrene (ST), 10 mg of azobisisobutyronitrile, and 5 ml of toluene were mixed. A graphite particle-dispersed liquid was obtained in the same manner as in Example 1, except that 20 mg of this ST (100) homopolymer was used instead of the ST-DMMAA (35:65) random copolymer.

Comparative Example 2

1.23 g of an MMA-DMMAA (35:65) random copolymer (Mn=62000) was obtained in the same manner as in Example 1, except that 0.67 g of methyl methacrylate (MMA) was used instead of the styrene. A graphite particle-dispersed liquid was obtained in the same manner as in Example 1, except that 20 mg of this MMA-DMMAA (35:65) random copolymer was used instead of the ST-DMMAA (35:65) random copolymer.

Comparative Example 3

0.6 g of an MMA-DMMAA (50:50) random copolymer (Mn=53000) was obtained in the same manner as in Example 2, except that 1 g of methyl methacrylate (MMA) was used instead of the styrene. A graphite particle-dispersed liquid was obtained in the same manner as in Example 2, except that 20 mg of this MMA-DMMAA (50:50) random copolymer was used instead of the ST-DMMAA (50:50) random copolymer.

Comparative Example 4

0.8 g of an MMA-DMMAA (65:35) random copolymer (Mn=43000) was obtained in the same manner as in Example 3, except that 1.23 g of methyl methacrylate (MMA) was used instead of the styrene. A graphite particle-dispersed liquid was obtained in the same manner as in Example 3, except that 20 mg of this MMA-DMMAA (65:35) random copolymer was used instead of the ST-DMMAA (65:35) random copolymer.

Comparative Example 5

0.8 g of an MMA-DMMAA (80:20) random copolymer (Mn=63000) was obtained in the same manner as in Example 4, except that 1.6 g of methyl methacrylate (MMA) was used instead of the styrene. A graphite particle-dispersed liquid was obtained in the same manner as in Example 4, except that 20 mg of this MMA-DMMAA (80:20) random copolymer was used instead of the ST-DMMAA (80:20) random copolymer.

Comparative Example 6

A graphite particle-dispersed liquid was obtained in the same manner as in Example 1, except that the ST-DMMAA (35:65) random copolymer was not used.

Comparative Example 7

0.93 g of a DMMAA (100) homopolymer (Mn=72000) was obtained in the same manner as in Comparative Example 1, except that 2 g of N,N-dimethylmethacrylamide (DMMAA) was used instead of the styrene. A graphite particle-dispersed liquid was obtained in the same manner as in Example 1, except that 20 mg of this DMMAA (100) homopolymer was used instead of the ST-DMMAA (35:65) random copolymer.

Comparative Example 8

1.1 g of a PM-DMMAA (30:70) random copolymer (Mn=55000) was obtained in the same manner as in Example 1, except that 0.6 g of phenylmaleimide (PM) was used instead of the styrene, and the amount of N,N-dimethylmethacrylamide (DMMAA) was changed to 1.4 g. A graphite particle-dispersed liquid was obtained in the same manner as in Example 1, except that 20 mg of this PM-DMMAA (30:70) random copolymer was used instead of the ST-DMMAA (35:65) random copolymer.

<Visual Observation of Graphite Particle-Dispersed Liquid>

The graphite particle-dispersed liquids obtained in Examples and Comparative Examples were allowed to stand still for 24 hours, and then visually observed. Parts (A) to (C) of FIG. 1 are photographs of the graphite particle-dispersed liquids obtained in Example 1, Comparative Example 2 and Comparative Example 6, respectively. As is apparent from the results shown in FIG. 1, in the case (Example 1) where the graphite particles and the aromatic vinyl copolymer according to the present invention were mixed with each other, the graphite particles were not precipitated even after the standing still for 24 hours, and the obtained dispersion liquid was excellent in dispersion stability (Part (A) of FIG. 1). In addition, in the dispersion liquids obtained in Examples 2 to 6, the graphite particles were not precipitated even after the standing still for 24 hours, and the dispersion liquids were excellent in dispersion stability. On the other hand, in the case (Comparative Example 2) where the vinyl copolymer containing no vinyl aromatic monomer unit was used instead of the aromatic vinyl copolymer according to the present invention and in the case (Comparative Example 6) where no aromatic vinyl copolymer according to the present invention was used, the graphite particles were precipitated after the standing still for 24 hours, and the obtained dispersion liquids were each separated into a transparent supernatant liquid and graphite particles, and were poor in dispersion stability ((Parts (B) and (C) of FIG. 1), respectively).

<Observation of Graphite Particles with Optical Microscope>

The graphite particle-dispersed liquids obtained in Examples and Comparative Examples were observed with an optical microscope (at 400 magnification). FIGS. 2A to 2G show optical micrographs of the graphite particle-dispersed liquids obtained in Examples 4 to 6 and Comparative Examples 5 to 8, respectively.

Figure 2A:
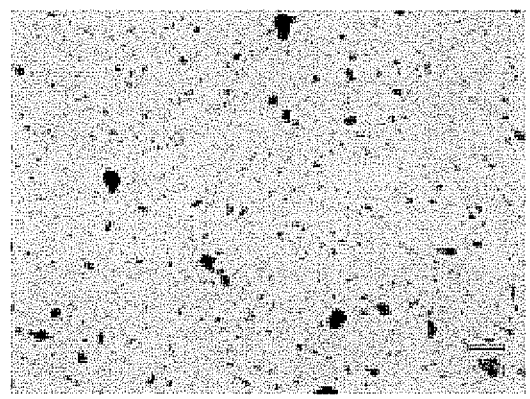
FIG. 2A is an optical micrograph of a graphite particle-dispersed liquid obtained in Example 4.
Figure 2B:
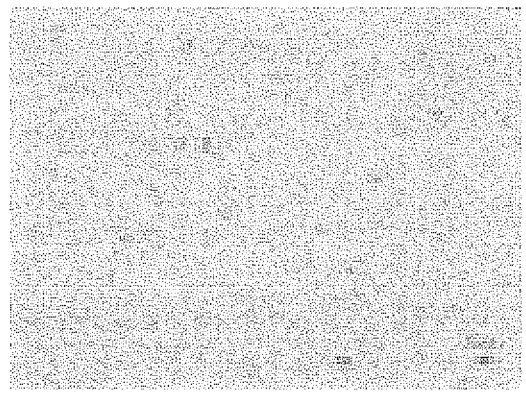
FIG. 2B is an optical micrograph of a graphite particle-dispersed liquid obtained in Example 5.
Figure 2C:
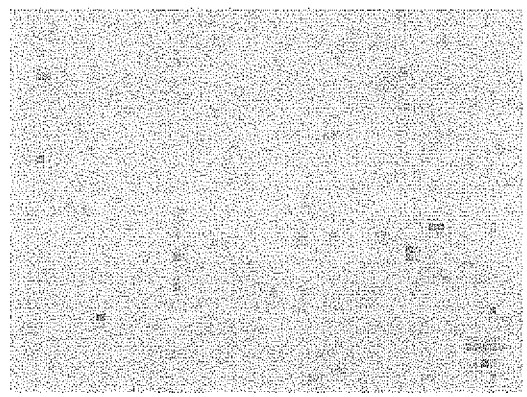
FIG. 2C is an optical micrograph of a graphite particle-dispersed liquid obtained in Example 6.
Figure 2D:
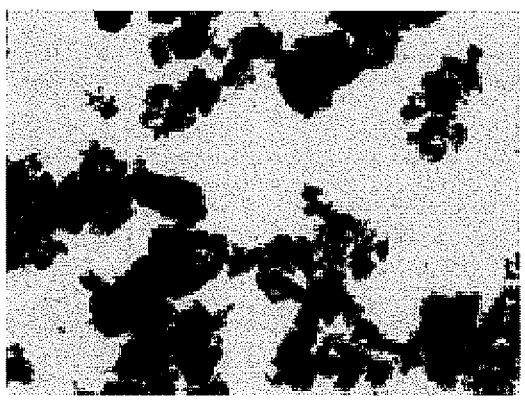
FIG. 2D is an optical micrograph of a graphite particle-dispersed liquid obtained in Comparative Example 5.
Figure 2E:
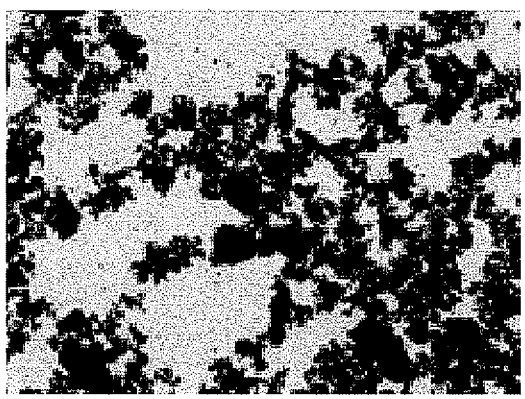
FIG. 2E is an optical micrograph of a graphite particle-dispersed liquid obtained in Comparative Example 6.
Figure 2F:
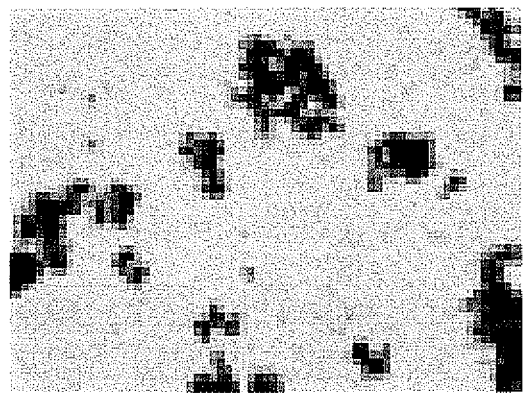
FIG. 2F is an optical micrograph of a graphite particle-dispersed liquid obtained in Comparative Example 7.
Figure 2G:
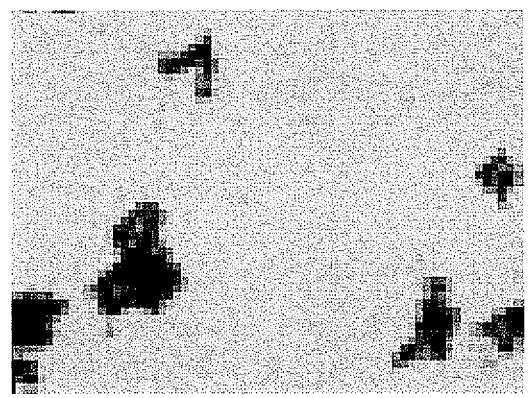
FIG. 2G is an optical micrograph of a graphite particle-dispersed liquid obtained in Comparative Example 8.

As is apparent from the results shown in FIGS. 2A to 2C, it was observed that fine graphite particles were formed in the cases (Examples 4 to 6) where the graphite particles and the aromatic vinyl copolymer according to the present invention were mixed with each other. Moreover, such formation of fine graphite particles was also observed in the dispersion liquids obtained in Examples 1 to 3.

On the other hand, as is apparent from the results shown in FIGS. 2D to 2G, it was found that insufficiently ground clumpy graphite particles were formed in the case (Comparative Example 5) where the vinyl copolymer containing no vinyl aromatic monomer unit was used instead of the aromatic vinyl copolymer according to the present invention, in the case (Comparative Example 6) where no aromatic vinyl copolymer according to the present invention was used, in the case (Comparative Example 7) where the N,N-dimethylmethacrylamide homopolymer was used instead of the aromatic vinyl copolymer according to the present invention, and in the case (Comparative Example 8) where the phenylmaleimide unit was introduced into the copolymer instead of the vinyl aromatic monomer unit according to the present invention. Moreover, such clumpy graphite particles were observed also in the dispersion liquids obtained in Comparative Examples 1 to 4.

<Observation of Graphite Particles with Scanning Electron Microscope>

Figure 3A:
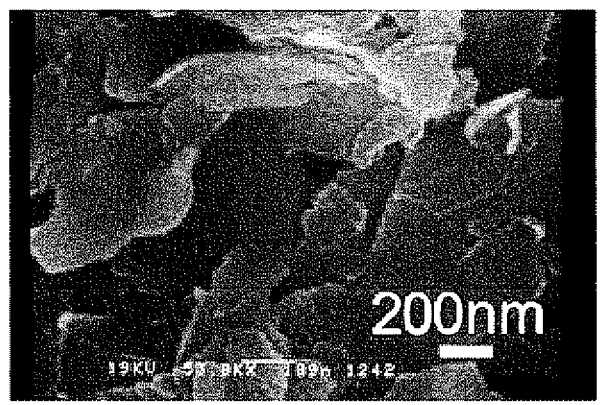
FIG. 3A is a scanning electron micrograph of the graphite particle-dispersed liquid obtained in Example 4.
Figure 3B:
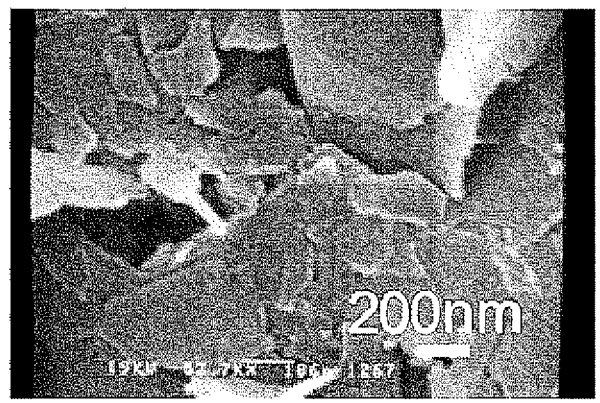
FIG. 3B is a scanning electron micrograph of fine graphite particles sampled from the graphite particle-dispersed liquid obtained in Example 5.
Figure 3C:
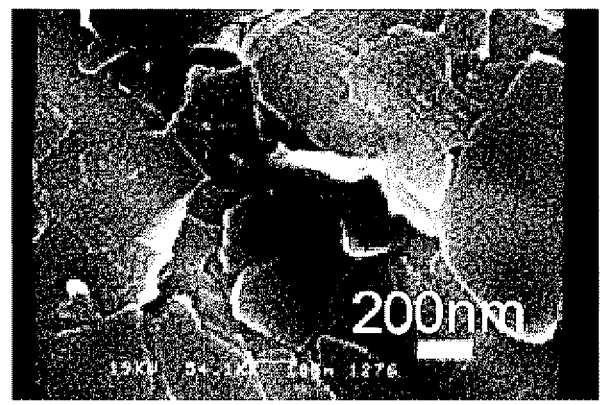
FIG. 3C is a scanning electron micrograph of fine graphite particles sampled from the graphite particle-dispersed liquid obtained in Example 6.
Figure 3D:
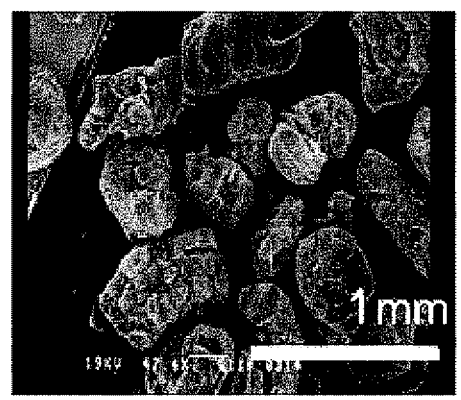
FIG. 3D is a scanning electron micrograph of graphite particles used as a raw material.

Graphite particles were sampled from each of the graphite particle-dispersed liquids obtained in Examples and Comparative Examples, and observed with a scanning electron microscope (SEM). FIGS. 3A to 3C show SEM photographs of graphite particles sampled from the graphite particle-dispersed liquids obtained in Examples 4 to 6, respectively. In addition, FIG. 3D shows a SEM photograph of graphite particles, which were a raw material.

As is apparent from the results shown in FIGS. 3A to 3D, it was found that plate-like fine graphite particles were formed in the cases (Examples 4 to 6) where the clumpy graphite particles, which were a raw material, were mixed with the aromatic vinyl copolymer according to the present invention. In addition, it was found that plate-like fine graphite particles were formed also in the dispersion liquids obtained in Examples 1 to 3. Table 1 shows measurement results of the length, width, and thickness of such plate-like graphite particles. On the other hand, the shapes of the graphite particles sampled from the graphite particle-dispersed liquids obtained in Comparative Examples 1 to 8 were indefinite clumpy shape.

TABLE 1

| | | | Graphite particles in dispersion liquid | | |
|---|---|---|---|---|---|
| | Polymer | Shape | Long diameter ($\mu$m) | Short diameter ($\mu$m) | Thickness (nm) |
| Example 1 | ST-DMMAA (35:65) copolymer | Plate shape | 10-20 | 5-10 | 10-20 |
| Example 2 | ST-DMMAA (50:50) copolymer | Plate shape | 10-20 | 5-10 | 10-20 |
| Example 3 | ST-DMMAA (65:35) copolymer | Plate shape | 10-20 | 5-10 | 10-20 |
| Example 4 | ST-DMMAA (80:20) copolymer | Plate shape | 10-20 | 5-10 | 10-20 |
| Example 5 | VN-DMMAA (30:70) copolymer | Plate shape | 10-20 | 5-10 | 10-20 |
| Example 6 | VA-DMMAA (30:70) copolymer | Plate shape | 10-20 | 5-10 | 10-20 |
| Comp. Ex. 1 | ST (100) homopolymer | Indefinite clumpy shape | — | — | — |
| Com p. Ex, 2 | MMA-DMMAA (35:65) copolymer | Indefinite clumpy shape | — | — | — |
| Comp. Ex. 3 | MMA-DMMAA (50:50) copolymer | Indefinite clumpy shape | — | — | — |
| Comp. Ex. 4 | MMA-DMMAA (65:35) copolymer | Indefinite clumpy shape | — | — | — |
| Comp. Ex. 5 | MMA-DMMAA (80:20) copolymer | Indefinite clumpy shape | — | — | — |
| Comp. Ex. 6 | — | Indefinite clumpy shape | — | — | — |
| Comp. Ex. 7 | DMMAA (100) homopolymer | Indefinite clumpy shape | 100-200 | 50-100 | 50-100 |
| Comp. Ex. 8 | PM-DMMM (30:70) copolymer | indefinite clumpy shape | 100-200 | 50-100 | 50-100 |

Example 7

0.82 g of an ST-DMMAA (91:9) random copolymer (Mn=58000) was obtained in the same manner as in Example 1, except that the amount of styrene (ST) was changed to 1.82 g, and the amount of N,N-dimethylmethacrylamide (DMMAA) was changed to 0.18 g. A graphite particle-dispersed liquid was obtained in the same manner as in Example 1, except that 20 mg of this ST-DMMAA (91:9) random copolymer was used instead of the ST-DMMAA (35:65) random copolymer.

Example 8

0.53 g of an ST-DMMAA (94:6) random copolymer (Mn=70000) was obtained in the same manner as in Example 1, except that the amount of styrene (ST) was changed to 1.88 g, and the amount of N,N-dimethylmethacrylamide (DMMAA) was changed to 0.12 g. A graphite particle-dispersed liquid was obtained in the same manner as in Example 1, except that 20 mg of this ST-DMMAA (94:6) random copolymer was used instead of the ST-DMMAA (35:65) random copolymer.

Example 9

0.77 g of an ST-PM (67:33) random copolymer (Mn=62000) was obtained in the same manner as in Example 1, except that 0.66 g of N-phenylmaleimide (PM) was used instead of the N,N-dimethylmethacrylamide, and the amount of styrene (ST) was changed to 1.34 g. A graphite particle-dispersed liquid was obtained in the same manner as in Example 1, except that 20 mg of this ST-PM (67:33) random copolymer was used instead of the ST-DMMAA (35:65) random copolymer.

Example 10

0.92 g of an ST-PM (83:17) random copolymer (Mn=48000) was obtained in the same manner as in Example 9, except that the amount of styrene (ST) was changed to 1.66 g, and the amount of N-phenylmaleimide (PM) was changed to 0.34 g. A graphite particle-dispersed liquid was obtained in the same manner as in Example 9, except that 20 mg of this ST-PM (83:17) random copolymer was used instead of the ST-PM (67:33) random copolymer.

Example 11

0.66 g of an ST-PM (91:9) random copolymer (Mn=58000) was obtained in the same manner as in Example 9, except that the amount of styrene (ST) was changed to 1.82 g, and the amount of N-phenylmaleimide (PM) was changed to 0.18 g. A graphite particle-dispersed liquid was obtained in the same manner as in Example 9, except that 20 mg of this ST-PM (91:9) random copolymer was used instead of the ST-PM (67:33) random copolymer.

Example 12

0.77 g of an ST-PM (94:6) random copolymer (Mn=52000) was obtained in the same manner as in Example 9, except that the amount of styrene (ST) was changed to 1.88 g, and the amount of N-phenylmaleimide (PM) was changed to 0.12 g. A graphite particle-dispersed liquid was obtained in the same manner as in Example 9, except that 20 mg of this ST-PM (94:6) random copolymer was used instead of the ST-PM (67:33) random copolymer.

<Dispersion Stability of Graphite Particles in Dispersion Liquid>

The graphite particle-dispersed liquid obtained in Example 11 was allowed to stand still, and 100 µl was sampled from the dispersion liquid at constant intervals. The sampled dispersion liquid was diluted by adding 3.5 ml of DMF thereto, and measured for the absorbance at a wavelength of 500 nm by using a cell with an optical path length of 1 cm. As a result, it was found that the absorbance was almost unchanged even after the standing still for 24 hours and the obtained dispersion liquid was excellent in dispersion stability.

Figure 4:
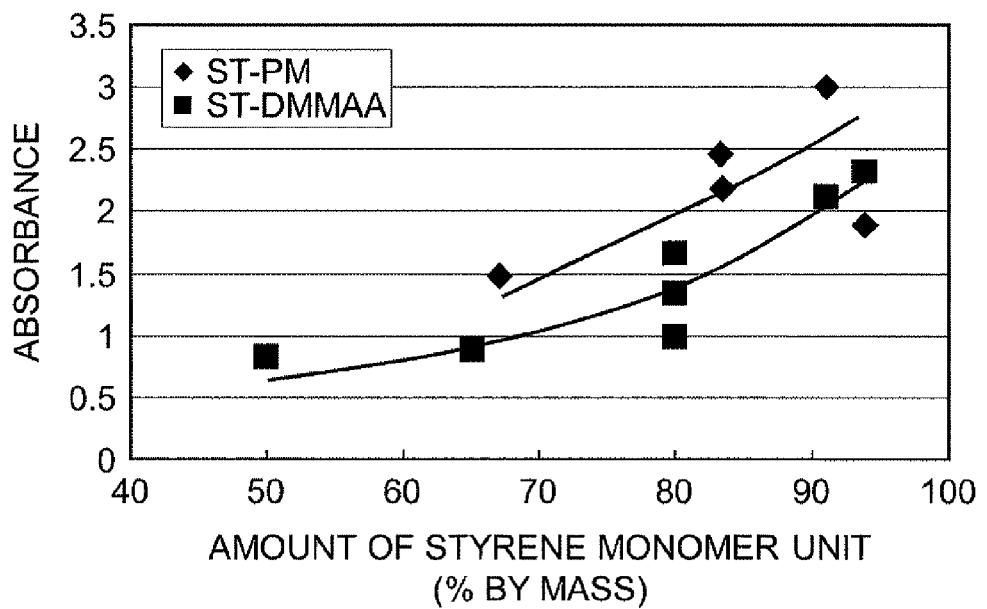
FIG. 4 is a graph showing the relationship between the amount of a styrene monomer unit and the absorbance of each graphite particle-dispersed liquid after standing still for 24 hours.

Moreover, the graphite particle-dispersed liquids obtained in Examples 2 to 4 and Examples 7 to 12 were each allowed to stand still for 24 hours. Then, 100 µl of each dispersion liquid was diluted by adding 4 ml of DMF thereto, and was measured for the absorbance at a wavelength of 500 nm by using a cell with an optical path length of 1 cm. FIG. 4 shows the results.

As is apparent from the results shown in FIG. 4, it was found that the absorbance was increased, and the dispersion stability was improved, as the amount of the styrene monomer unit increased. This is presumably because the higher the amount of the styrene monomer unit was, the more easily the fine graphite particles were formed.

Example 13

0.37 g of an ST-VI (91:9) random copolymer (Mn=18000) was obtained in the same manner as in Example 11, except that 0.18 g of 1-vinylimidazole (VI) was used instead of the N-phenylmaleimide. A graphite particle-dispersed liquid was obtained in the same manner as in Example 11, except that 20 mg of this ST-VI (91:9) random copolymer was used instead of the ST-PM (91:9) random copolymer.

Example 14

0.82 g of an ST-4VP (91:9) random copolymer (Mn=48000) was obtained in the same manner as in Example 11, except that 0.18 g of 4-vinylpyridine (4VP) was used instead of the N-phenylmaleimide. A graphite particle-dispersed liquid was obtained in the same manner as in Example 11, except that 20 mg of this ST-4VP (91:9) random copolymer was used instead of the ST-PM (91:9) random copolymer.

Example 15

0.88 g of an ST-DMAEMA (91:9) random copolymer (Mn=52000) was obtained in the same manner as in Example 11, except that 0.18 g of N,N-dimethylaminoethyl methacrylate (DMAEMA) was used instead of the N-phenylmaleimide. A graphite particle-dispersed liquid was obtained in the same manner as in Example 11, except that 20 mg of this ST-DMAEMA (91:9) random copolymer was used instead of the ST-PM (91:9) random copolymer.

Example 16

0.79 g of an ST-MMA (91:9) random copolymer (Mn=54000) was obtained in the same manner as in Example 11, except that 0.18 g of methyl methacrylate (MMA) was used instead of the N-phenylmaleimide. A graphite particle-dispersed liquid was obtained in the same manner as in Example 11, except that 20 mg of this ST-MMA (91:9) random copolymer was used instead of the ST-PM (91:9) random copolymer.

Example 17

0.83 g of an ST-HEMA (91:9) random copolymer (Mn=77000) was obtained in the same manner as in Example 11, except that 0.18 g of hydroxyethyl methacrylate (HEMA) was used instead of the N-phenylmaleimide. A graphite particle-dispersed liquid was obtained in the same manner as in Example 11, except that 20 mg of this ST-HEMA (91:9) random copolymer was used instead of the ST-PM (91:9) random copolymer.

Example 18

0.95 g of an ST-2VP (91:9) random copolymer (Mn=89000) was obtained in the same manner as in Example 11, except that 0.18 g of 2-vinylpyridine (2VP) was used instead of the N-phenylmaleimide. A graphite particle-dispersed liquid was obtained in the same manner as in Example 11, except that 20 mg of this ST-2VP (91:9) random copolymer was used instead of the ST-PM (91:9) random copolymer.

<Dispersion Stability of Graphite Particles in Dispersion Liquid>

Figure 5:
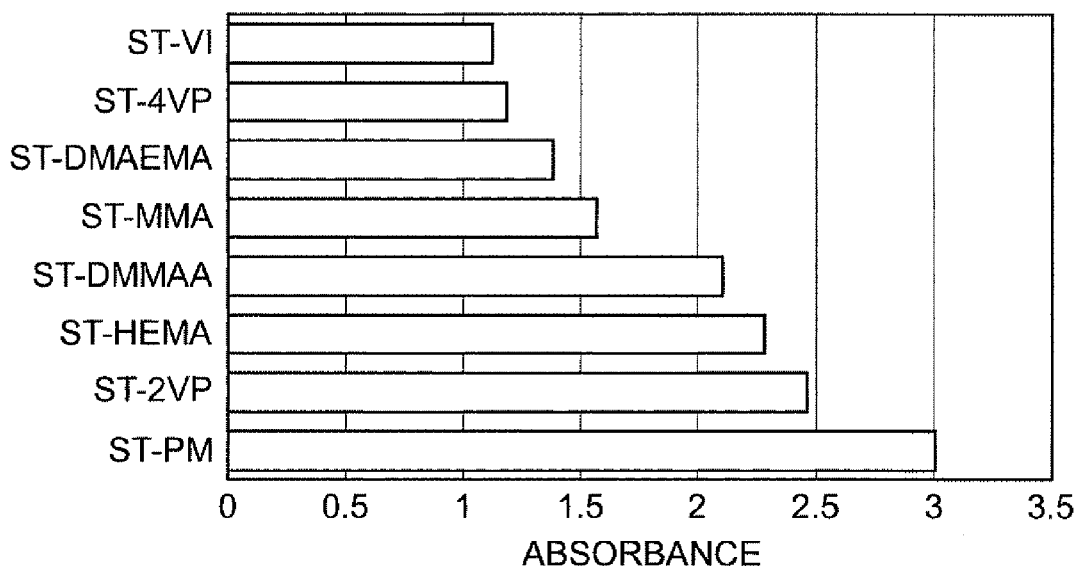
FIG. 5 is a graph showing the absorbance of each graphite particle-dispersed liquid after standing still for 24 hours in a case where each aromatic vinyl copolymer was mixed.

The graphite particle-dispersed liquids obtained in Examples 7, 11, and 13 to 18 were each allowed to stand still for 24 hours. Then 100 µl of each dispersion liquid was diluted by adding 3.5 ml of DMF thereto, and was measured for the absorbance at a wavelength of 500 nm by using a cell with an optical path length of 1 cm. FIG. 5 shows the results.

As is apparent from the results shown in FIG. 5, it was found that, in all the cases where the random copolymers were used, the dispersion liquids exhibited high absorbance, and fine graphite particles were formed, and highly dispersed.

Example 19

Graphite particle-dispersed liquids were obtained in the same manner as in Example 11, except that the amount of the ST-PM (91:9) random copolymer added was changed to 1 mg, 2 mg, 5 mg, or 10 mg.

<Dispersion Stability of Graphite Particles in Dispersion Liquid>

Figure 6:
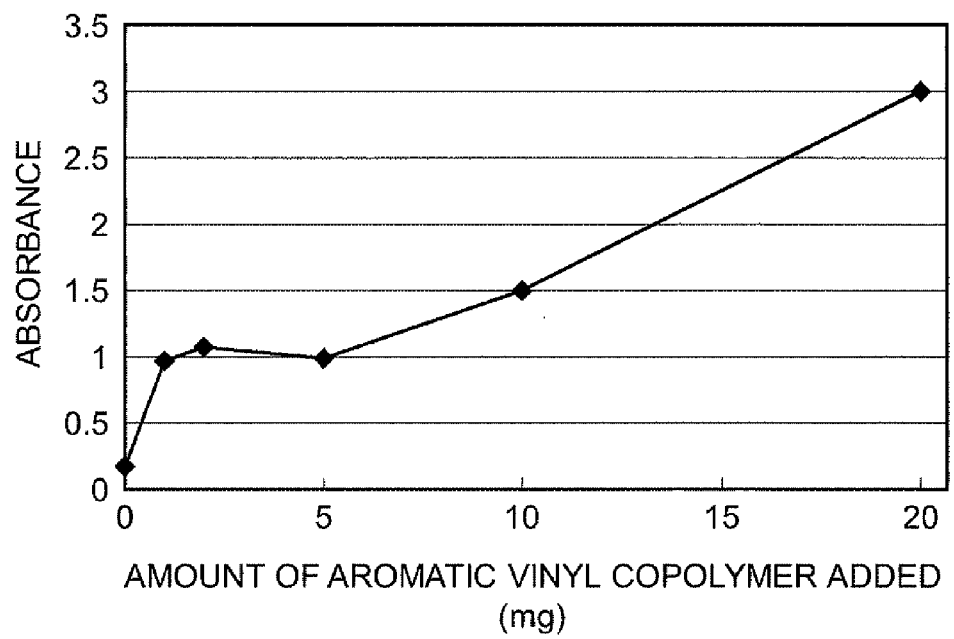
FIG. 6 is a graph showing the relationship between the amount of an aromatic vinyl copolymer added and the absorbance of a graphite particle-dispersed liquid after standing still for 24 hours.

The graphite particle-dispersed liquids obtained in Examples 11 and 19, and Comparative Example 6 were each allowed to stand still for 24 hours. Then 100 µl of each dispersion liquid was diluted by adding 3.5 ml of DMF thereto, and was measured for the absorbance at a wavelength of 500 nm by using a cell with an optical path length of 1 cm. FIG. 6 shows the results.

As is apparent from the results shown in FIG. 6, it was found that the addition of the ST-PM (91:9) random copolymer resulted in increase in absorbance, and fine graphite particles were formed, and the dispersion stability was improved. Moreover, the absorbance tended to increase with the increase in the amount of the ST-PM (91:9) random copolymer added.

Example 20

Graphite particle-dispersed liquids were obtained in the same manner as in Example 11, except that the amount of the urea-hydrogen peroxide inclusion complex added was changed to 1 mg, 2 mg, 10 mg, 20 mg, or 40 mg.

Comparative Example 9

A graphite particle-dispersed liquid was obtained in the same manner as in Example 11, except that the urea-hydrogen peroxide inclusion complex was not added.

<Dispersion Stability of Graphite Particles in Dispersion Liquid>

Figure 7:
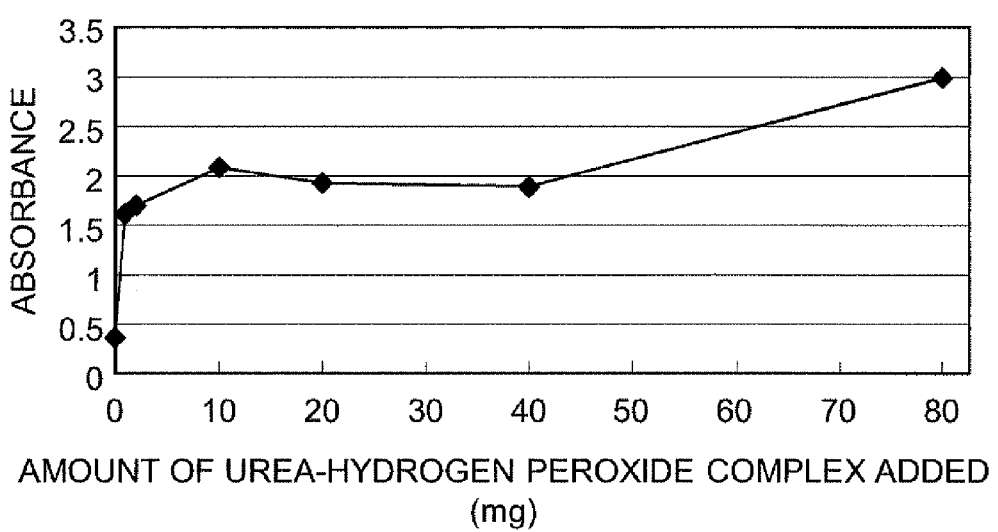
FIG. 7 is a graph showing the relationship between the amount of a urea-hydrogen peroxide inclusion complex added and the absorbance of a graphite particle-dispersed liquid after standing still for 24 hours.

The graphite particle-dispersed liquids obtained in Examples 11 and 20 and Comparative Example 9 were each allowed to stand still for 24 hours. Then 100 µl of each dispersion liquid was diluted by adding 3.5 ml of DMF thereto, and was measured for the absorbance at a wavelength of 500 nm by using a cell with an optical path length of 1 cm. FIG. 7 shows the results.

As is apparent from the results shown in FIG. 7, it was found that the addition of the urea-hydrogen peroxide inclusion complex resulted in the increase in absorbance, and fine graphite particles were formed, and the dispersion stability was improved.

Example 21

Graphite particle-dispersed liquids (to which the ST-DM-MAA (80:20) random copolymer was added) were obtained in the same manner as in Example 4, except that 2 ml of chloroform, chlorobenzene, dichlorobenzene, or N-methylpyrrolidone (NMP) was mixed instead of the N,N-dimethylformamide (DMF).

<Dispersion Stability of Graphite Particles in Dispersion Liquid>

The graphite particle-dispersed liquids obtained in Examples 4 and 21 were each allowed to stand still for 24 hours. Then 100 µl of each dispersion liquid was diluted by adding 3.5 ml of the solvent used thereto, and was measured for the absorbance at a wavelength of 500 nm by using a cell with an optical path length of 1 cm. Table 2 shows the results.

TABLE 2

| Solvent | Absorbance |
| --- | --- |
| DMF | 3.0 |
| Chloroform | 2.7 |
| Chlorobenzene | 2.5 |
| Dichlorobenzene | 2.5 |
| NMP | 3.1 |

As is apparent from the results shown in Table 2, in each of the cases where chloroform, chlorobenzene, dichlorobenzene, or NMP was used as the solvent, the absorbance exhibited was at the same level as that in the case where DMF was used, and the graphite particle-dispersed liquids having an excellent dispersion stability were obtained.

Example 22

Graphite particle-dispersed liquids (to which the ST-PM (91:9) random copolymer was added) were obtained in the same manner as in Example 11, except that 2 ml of dichloromethane, toluene, dioxane, propanol, γ-picoline, acetonitrile, or dimethyl sulfoxide (DMSO) was mixed instead of the N,N-dimethylformamide (DMF).

<Dispersion Stability of Graphite Particles in Dispersion Liquid>

The graphite particle-dispersed liquids obtained Examples 11 and 22 were each allowed to stand still for 24 hours. Then 100 µl of each dispersion liquid was diluted by adding 3.5 ml of the solvent used thereto, and was measured for the absorbance at a wavelength of 500 nm by using a cell with an optical path length of 1 cm. Table 3 shows the results.

TABLE 3

| Solvent | Absorbance |
| --- | --- |
| DMF | 3.0 |
| Dichloromethane | 2.1 |
| Toluene | 1.3 |
| Dioxane | 2.2 |
| Propanol | 1.8 |
| γ-Picoline | 2.5 |
| Acetonitrile | 1.8 |
| DMSO | 2.5 |

As is apparent from the results shown in Table 3, in each of the cases where dichloromethane, toluene, dioxane, propanol, or acetonitrile was used as the solvent, the dispersion stability of the graphite particles was sufficient, although the absorbance decreased slightly as compared with that in the case where DMF was used. Meanwhile, in each of the cases where γ-picoline or DMSO was used, the absorbance exhibited was at the same level as that in the case where DMF was used, and the graphite particle-dispersed liquids having an excellent dispersion stability were obtained.

Example 23

A graphite particle-dispersed liquid was obtained in the same manner as in Example 18, except that 20 mg of a styrene-2-vinylpyridine block copolymer (manufactured by Polymer Source Inc, Mn of the styrene (ST) block=48000, Mn of the 2-vinylpyridine (2VP) block=46000, hereinafter, abbreviated as an "ST-2VP (48K/46K) block copolymer") was used instead of the ST-2VP (91:9) random copolymer.

Example 24

A graphite particle-dispersed liquid was obtained in the same manner as in Example 18, except that 20 mg of a styrene-2-vinylpyridine block copolymer (manufactured by Polymer Source Inc, Mn of the styrene (ST) block=57000, Mn of the 2-vinylpyridine (2VP) block=57000, hereinafter abbreviated as an "ST-2VP (57K/57K) block copolymer") was used instead of the ST-2VP (91:9) random copolymer.

Example 25

A graphite particle-dispersed liquid was obtained in the same manner as in Example 18, except that 20 mg of a styrene-2-vinylpyridine block copolymer (manufactured by Polymer Source Inc, Mn of the styrene (ST) block=102000, Mn of the 2-vinylpyridine (2VP) block=97000, hereinafter abbreviated as an "ST-2VP (102K/97K) block copolymer") was used instead of the ST-2VP (91:9) random copolymer.

Example 26

A graphite particle-dispersed liquid was obtained in the same manner as in Example 16, except that 20 mg of a styrene-methyl methacrylate block copolymer (manufactured by Polymer Source Inc, Mn of the styrene (ST) block=5000, Mn of the methyl methacrylate (MMA) block=5000, hereinafter abbreviated as an "ST-MMA (5K/5K) block copolymer") was used instead of the ST-MMA (91:9) random copolymer.

Example 27

A graphite particle-dispersed liquid was obtained in the same manner as in Example 16, except that 20 mg of a styrene-methyl methacrylate block copolymer (manufactured by Polymer Source Inc, Mn of the styrene (ST) block=48000, Mn of the methyl methacrylate (MMA) block=46000, hereinafter abbreviated as an "ST-MMA (48K/46K) block copolymer") was used instead of the ST-MMA (91:9) random copolymer.

Example 28

A graphite particle-dispersed liquid was obtained in the same manner as in Example 16, except that 20 mg of a styrene-methyl methacrylate block copolymer (manufactured by Polymer Source Inc, Mn of the styrene (ST) block=85000, Mn of the methyl methacrylate (MMA) block=91000, hereinafter abbreviated as an "ST-MMA (85K/91K) block copolymer") was used instead of the ST-MMA (91:9) random copolymer.

Example 29

A graphite particle-dispersed liquid was obtained in the same manner as in Example 16, except that 20 mg of a styrene-methyl methacrylate block copolymer (manufactured by Polymer Source Inc, Mn of the styrene (ST) block=170000, Mn of the methyl methacrylate (MMA) block=168000, hereinafter abbreviated as an "ST-MMA (170K/168K) block copolymer") was used instead of the ST-MMA (91:9) random copolymer.

Example 30

A graphite particle-dispersed liquid was obtained in the same manner as in Example 16, except that 20 mg of a styrene-polyethylene oxide block copolymer (manufactured by Polymer Source Inc, Mn of the styrene (ST) block=9500, Mn of the polyethylene oxide (PEO) block=9500, hereinafter abbreviated as an "ST-PEO (9.5K/9.5K) block copolymer") was used instead of the ST-MMA (91:9) random copolymer.

Example 31

A graphite particle-dispersed liquid was obtained in the same manner as in Example 30, except that 20 mg of a styrene-polyethylene oxide block copolymer (manufactured by Polymer Source Inc, Mn of the styrene (ST) block=37000, Mn of the polyethylene oxide (PEO) block=6500, hereinafter abbreviated as an "ST-PEO (37K/6.5K) block copolymer") was used instead of the ST-PEO (9.5K/9.5K) block copolymer.

Example 32

A graphite particle-dispersed liquid was obtained in the same manner as in Example 30, except that 20 mg of a styrene-polyethylene oxide block copolymer (manufactured by Polymer Source Inc, Mn of the styrene (ST) block=40000, Mn of the polyethylene oxide (PEO) block=42000, hereinafter abbreviated as an "ST-PEO (40K/42K) block copolymer") was used instead of the ST-PEO (9.5K/9.5K) block copolymer.

Example 33

A graphite particle-dispersed liquid was obtained in the same manner as in Example 30, except that 20 mg of a styrene-polyethylene oxide block copolymer (manufactured by Polymer Source Inc, Mn of the styrene (ST) block=58600, Mn of the polyethylene oxide (PEO) block=71000, hereinafter abbreviated as an "ST-PEO (58.6K/71K) block copolymer") was used instead of the ST-PEO (9.5K/9.5K) block copolymer.

<Dispersion Stability of Graphite Particles in Dispersion Liquid>

The graphite particle-dispersed liquids obtained in Examples 16, 18, and 23 to 33 were each allowed to stand still for 24 hours. Then 100 µl of each dispersion liquid was diluted by adding 3.5 ml of DMF thereto, and was measured for the absorbance at a wavelength of 500 nm by using a cell with an optical path length of 1 cm. Table 4 shows the results.

TABLE 4

|  | Monomer 1 | Monomer 2 | Sequence | Absorbance |
|---|---|---|---|---|
| Example 18 | ST (91% by mass) | 2VP (9% by mass) | Random | 2.46 |
| Example 23 | ST (Mn = 48000) | 2VP (Mn = 46000) | Block | 2.45 |
| Example 24 | ST (Mn = 57000) | 2VP (Mn = 57000) | Block | 2.64 |
| Example 25 | ST (Mn = 102000) | 2VP (Mn = 97000) | Block | 2.81 |
| Example 16 | ST (91% by mass) | MMA (9% by mass) | Random | 1.57 |
| Example 26 | ST (Mn = 5000) | MMA (Mn = 5000) | Block | 3.62 |
| Example 27 | ST (Mn = 48000) | MMA (Mn = 46000) | Block | 3.91 |
| Example 28 | ST (Mn = 85000) | MMA (Mn = 91000) | Block | 3.44 |
| Example 29 | ST (Mn = 170000) | MMA (Mn = 168000) | Block | 3.44 |
| Example 30 | ST (Mn = 9500) | PEO (Mn = 9500) | Block | 2.36 |
| Example 31 | ST (Mn = 37000) | PEO (Mn = 6500) | Block | 2.25 |
| Example 32 | ST (Mn = 40000) | PEO (Mn = 42000) | Block | 2.61 |
| Example 33 | ST (Mn = 58600) | PEO (Mn = 71000) | Block | 2.79 |

As is apparent from the results shown in Table 4, it was found that, in all the cases where the block copolymers were used, the dispersion liquids exhibited high absorbance, and fine graphite particles were formed, and highly dispersed. Particularly, it was found that, in the case where methyl methacrylate was used as a vinyl monomer other than the vinyl aromatic monomer, the addition of the block copolymer in each of Examples 26 to 29 resulted in a higher value of absorbance than the addition of the random copolymer in Example 16, and further fine graphite particles were formed, and were further highly dispersed.

<Surface Analysis of Graphite Particles>

Figure 8:
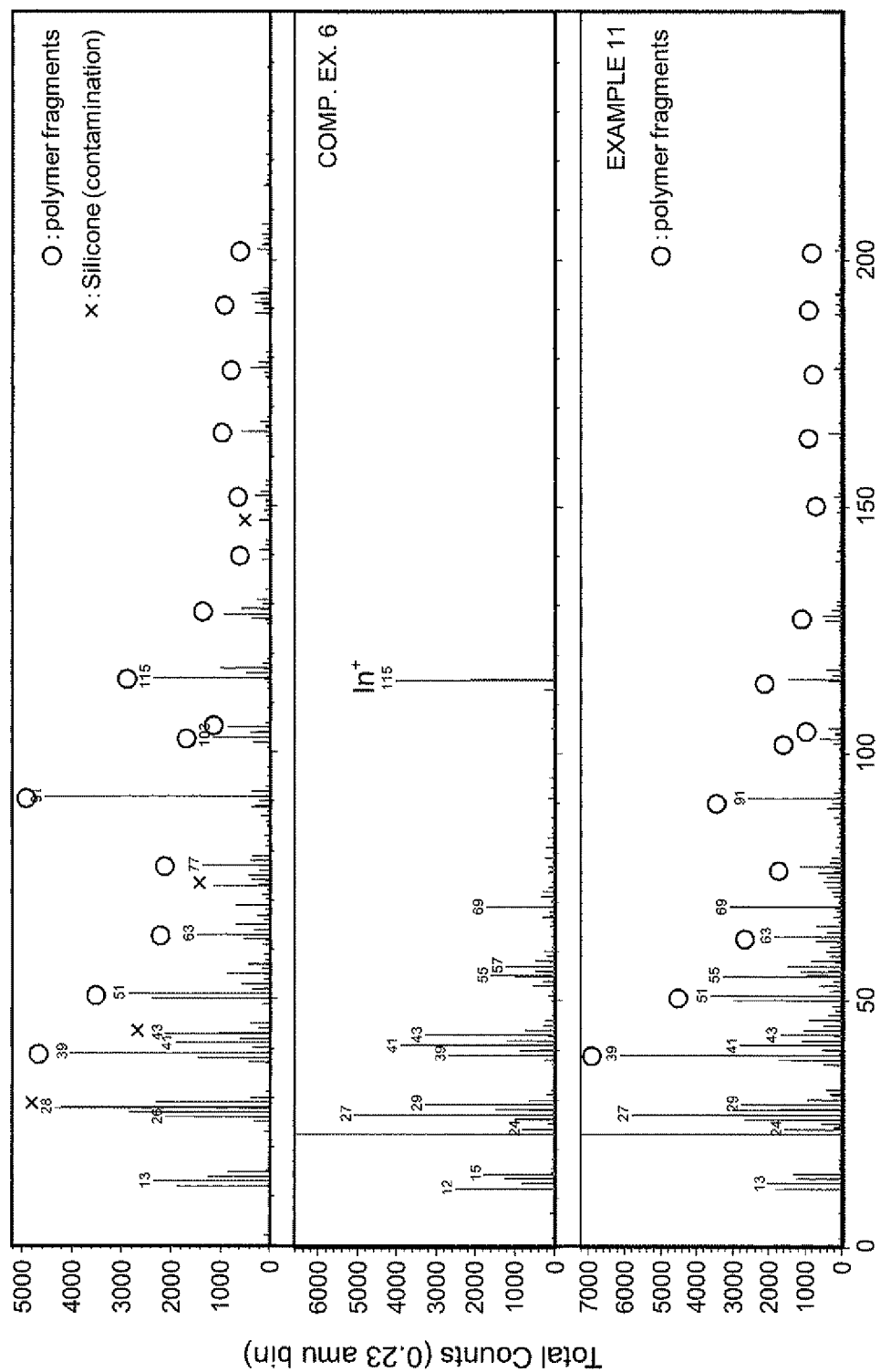
FIG. 8 is a graph showing results of TOF-SIMS measurement on fine graphite particles in graphite particle-dispersed liquids obtained in Example 11 and Comparative Example 6.

The graphite particle-dispersed liquid (to which the ST-PM (91:9) random copolymer was added) obtained in Example 11 and the graphite particle-dispersed liquid (to which no copolymer was added) obtained in Comparative Example 6 were each applied onto an indium foil and dried. Thus, graphite particle coating films were prepared. These graphite particle coating films were each subjected to time-of-flight secondary ion mass spectrometry (TOF-SIMS, positive ions: m/z 0-250) for analysis of a molecule present on the surface of each graphite particle coating film. The analysis result of the case where the ST-PM (91:9) random copolymer was added is shown at the bottom of FIG. 8, and the analysis result of the case where no copolymer was added is shown at the middle of FIG. 8. In addition, a TOF-SIMS measurement result of a coating film formed of the ST-PM (91:9) random copolymer by a casting method is shown at the top of FIG. 8.

Moreover, the obtained graphite particle coating films were each subjected to X-ray photoelectron spectroscopy (XPS). As a result, it was found that a hydroxyl group was bonded to a carbon atom near the surface of each coating film (in a region from the surface to a depth of 10 nm). Moreover, the amounts of carbon and oxygen near the surface of each coating film were measured, and the atomic ratio between carbon and oxygen was determined. Table 5 shows the results.

TABLE 5

|  | Atomic ratio | |
|---|---|---|
|  | Carbon atoms | Oxygen atoms |
| Example 11 | 100 | 1.13 |
| Comp. Ex. 6 | 100 | 3.05 |
| Raw material graphite particles | 100 | 1.92 |

As is apparent from the results shown in FIG. 8, no copolymer was observed on the surface of the graphite particle coating film formed from the graphite particle-dispersed liquid obtained in Comparative Example 6. On the other hand, it was found that the ST-PM (91:9) random copolymer was adsorbed on the surface of the graphite particle coating film formed from the graphite particle-dispersed liquid obtained in Example 11.

Moreover, as is apparent from the fragment pattern of the ST-PM (91:9) random copolymer shown at the bottom of FIG. 8, it was found that, of the copolymer components, a copolymer component containing the vinyl aromatic monomer unit in a larger amount was more likely to be adsorbed on the surface of the fine graphite particles.

As is apparent from the results shown in Table 5, the atomic ratio between carbon and oxygen present on the surface of the graphite particle was approximately 2 of oxygen atoms relative to 100 of carbon atoms in the graphite particles which are a raw material, whereas the atomic ratio was approximately 3 of oxygen atoms relative to 100 of carbon atoms in the graphite particles (Comparative Example 6) treated with the urea-hydrogen peroxide inclusion complex. Hence, it was found that hydroxyl group was introduced on the surface of the graphite particle by the treatment with the peroxyhydrate. On the other hand, the atomic ratio was lowered to approximately 1 of oxygen atoms relative to 100 of carbon atoms in the fine graphite particles (Example 11) treated with the urea-hydrogen peroxide inclusion complex in the presence of the aromatic vinyl copolymer according to the present invention. From these results, it was found that the surface of the plate-like graphite particle was coated by adsorption of the aromatic vinyl copolymer according to the present invention to hydroxyl group thereon.

From the above-described results, it is presumed that the fine graphite particles could be formed, and highly dispersed in various solvents because the surface of the plate-like graphite particle was coated by adsorption of the aromatic vinyl copolymer according to the present invention thereto.

<Electrical Conductivity>

The graphite particle-dispersed liquid (to which the ST-DMMAA (35:65) random copolymer was added) obtained in Example 1 was applied onto a glass plate and dried. Thus a graphite particle coating film was prepared. The electrical resistance between randomly selected two points (distance: 1 cm) on a surface of this coating film was measured by using a tester at room temperature. As a result, the electrical resistance was 10Ω.

Figure 9:
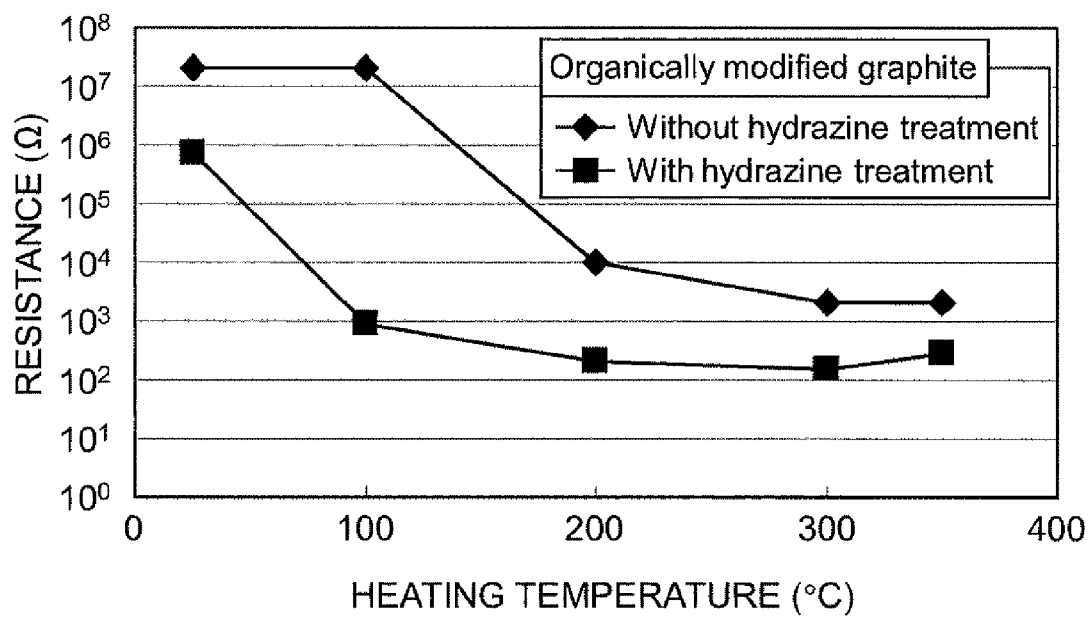
FIG. 9 is a graph showing the relationship between a heating temperature and electrical resistance of each conventional organically modified graphite film.

Moreover, an organically modified graphite material was prepared by treating a surface-oxidized graphite material with a cationic organic compound in accordance with the method described in Japanese Unexamined Patent Application Publication No. 2009-242209. Then, this organically modified graphite material was dispersed in chloroform. Organically modified graphite coating film was prepared by using this dispersion liquid in the same manner as described above. The surface of this organically modified graphite coating film was optionally treated with hydrazine, and the organically modified graphite coating film was subjected to a heat treatment at a predetermined temperature. The thus prepared organically modified graphite coating film subjected to the heat treatment without the hydrazine treatment and the organically modified graphite coating film subjected to the heat treatment with the hydrazine treatment were each measured for the electrical resistance on the surface of the coating film in the same manner as described above. FIG. 9 shows the relationship between the temperature in the heat treatment and the electrical resistance.

As is apparent from the value (10Ω) of the electrical resistance of the graphite particle coating film and the results shown in FIG. 9, the electrical resistance of the coating film formed of the fine graphite particles of the present invention (Example 1) was remarkably lower than those in the cases where the electrical resistance was lowered by subjecting, to a hydrazine treatment and/or a heat treatment, the coating film formed of the material obtained by organically modifying the surface-oxidized graphite material. Hence, it was found that the fine graphite particles of the present invention were extremely excellent in electrical conductivity.

<Absorption Spectrum>

Figure 10:
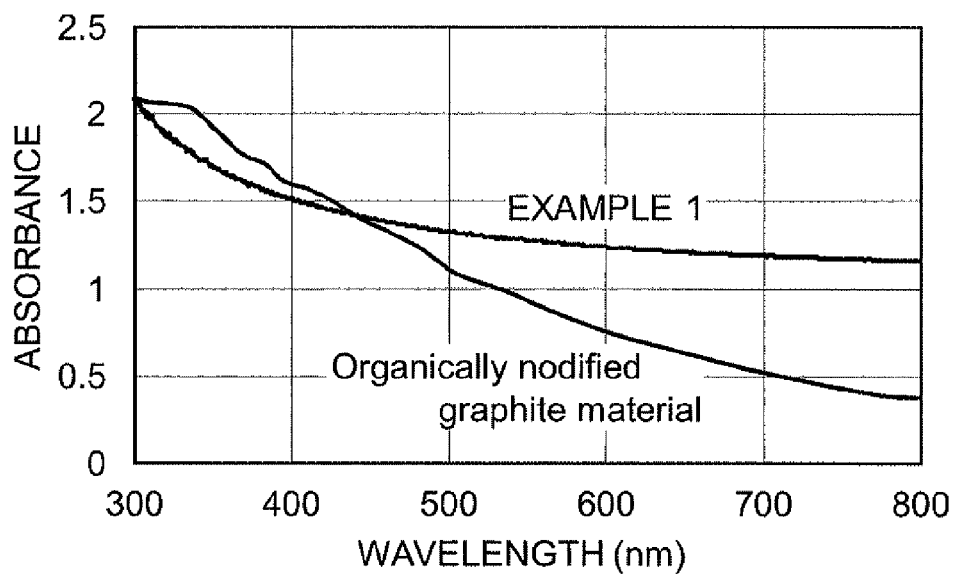
FIG. 10 is a graph showing an absorption spectrum of fine graphite particles obtained in Example 1.

The graphite particle-dispersed liquid (to which the ST-DMMAA (35:65) random copolymer was added) obtained in Example 1 was applied onto a silica glass plate, and dried. Thus, a graphite particle coating film having a thickness of 0.1 μm was prepared. The absorption spectrum of the coating film was measured in the wavelength range from 300 to 800 nm. FIG. 10 shows the results.

Moreover, an organically modified graphite material was prepared by treating a surface-oxidized graphite material with a cationic organic compound in accordance with the method described in Japanese Unexamined Patent Application Publication No. 2009-242209, and this organically modified graphite material was dispersed in chloroform. An organically modified graphite coating film having a thickness of 1 μm was prepared by using this dispersion liquid in the same manner as described above. The absorption spectrum of this organically modified graphite coating film was measured in the same manner as described above. FIG. 10 shows the results.

As is apparent from the results shown in FIG. 10, the absorbance of the organically modified graphite coating film was remarkably lowered in the long wavelength region of 500 nm or longer. From this result, many defects were presumably present in graphite layers in the organically modified graphite coating film. On the other hand, the decrease in absorbance of the coating film (Example 1) formed of the fine graphite particles of the present invention was small even in the long wavelength region of 500 nm or longer, and hence it is conceivable that the number of defects in the graphite particle coating film were relatively small.

<Raman Spectrum>

Figure 11:
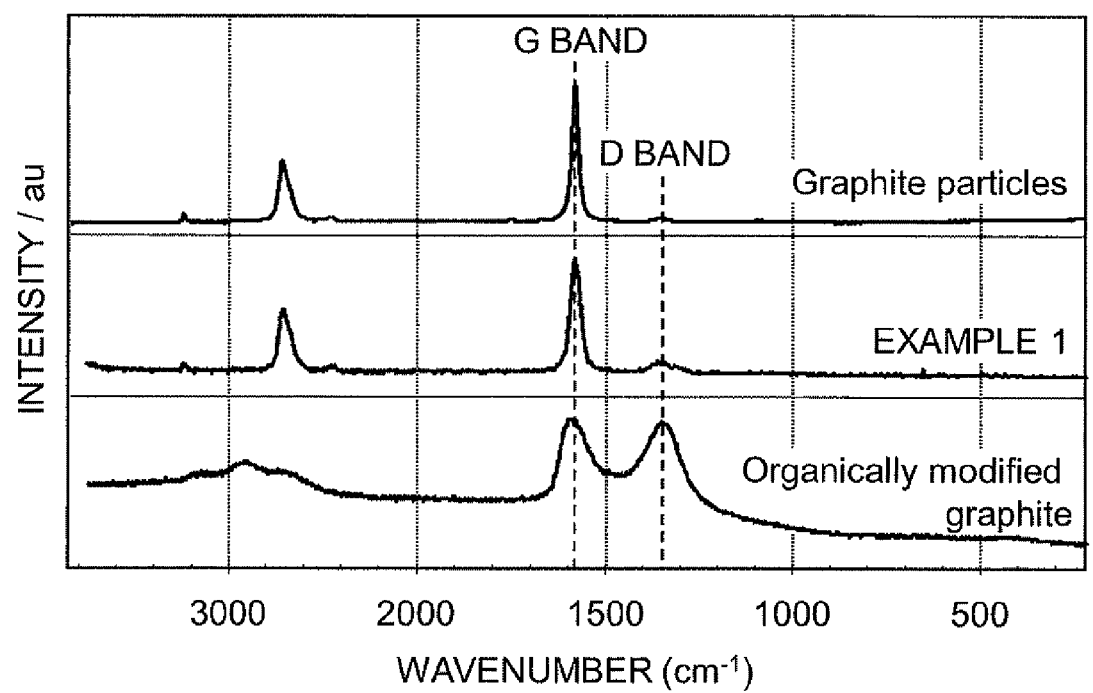
FIG. 11 is a graph showing a Raman spectrum of the fine graphite particles obtained in Example 1.

The graphite particle-dispersed liquid (to which the ST-DMMAA (35:65) random copolymer was added) obtained in Example 1 was cast onto a silica glass plate and dried. Thus, a graphite particle coating film having a thickness of 0.1 μm was prepared. A Raman spectrum of this coating film was measured. The result is shown at the middle of FIG. 11. Here, a Raman spectrum of the raw material graphite particles is shown at the top of FIG. 11.

Moreover, an organically modified graphite material was prepared by treating a surface-oxidized graphite material with a cationic organic compound in accordance with the method described in Japanese Unexamined Patent Application Publication No. 2009-242209, and this organically modified graphite material was dispersed in chloroform. An organically modified graphite coating film having a thickness of 1 μm was prepared by using this dispersion liquid in the same manner as described above. A Raman spectrum of this organically modified graphite coating film was measured. The result is shown at the bottom of FIG. 11.

As is apparent from the results shown in FIG. 11, the D band peak, which was rarely observed for the raw material graphite particles, was observed for the organically modified graphite material. Hence, it was found that the graphite sheet structure was destroyed in the organically modified graphite material. On the other hand, the D band peak was rarely observed for the fine graphite particles of the present invention, and hence it is conceivable that few defects were present in the fine graphite particles of the present invention.

<Measurement of Thickness of Fine Graphite Particles>

Figure 12A:
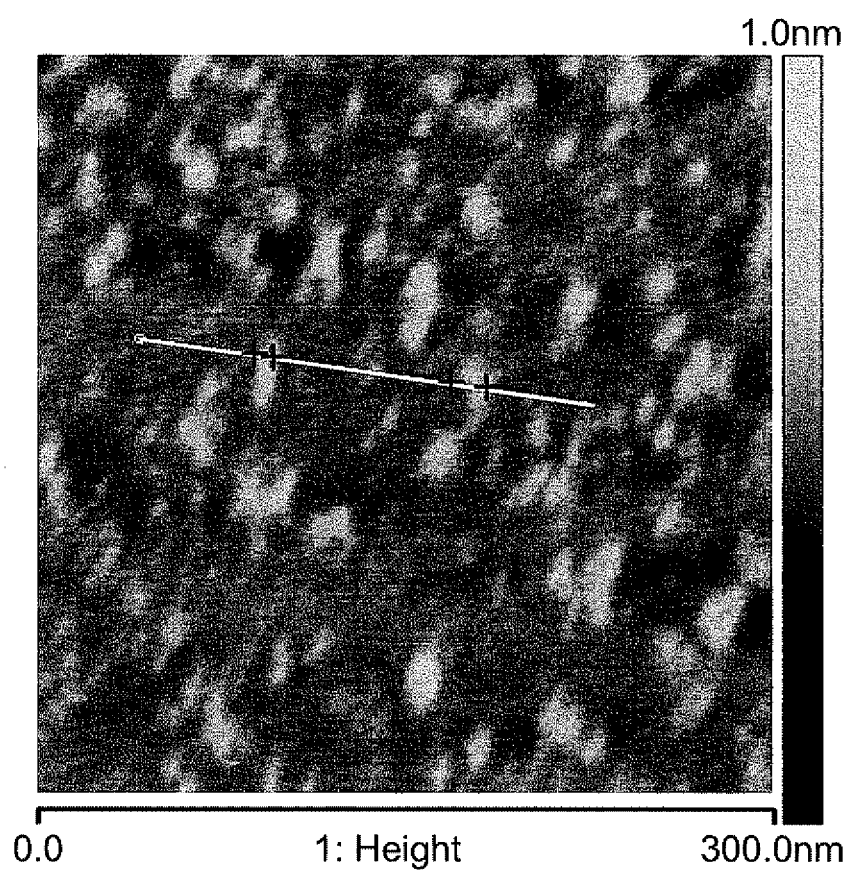
FIG. 12A is a scanning probe microscope photograph showing a surface shape of a graphite particle coating film formed by casting the graphite particle-dispersed liquid obtained in Example 1 onto a mica substrate.

The graphite particle-dispersed liquid (to which the ST-DMMAA (35:65) random copolymer was added) obtained in Example 1 was centrifuged at 1000 rpm to precipitate coarse particles. Then, the supernatant liquid was cast onto a mica substrate, and dried. Thus, a graphite particle coating film was prepared. This graphite particle coating film was observed by using a scanning probe microscope ("NanoScope V D3100" manufactured by Digital Instruments) equipped with Super Sharp Tip in a tapping mode. FIG. 12A shows a surface SPM image of the graphite particle coating film. Moreover, FIG. 12B shows a cross-sectional shape of the portion indicated by the straight line in FIG. 12A.

Figure 12B:
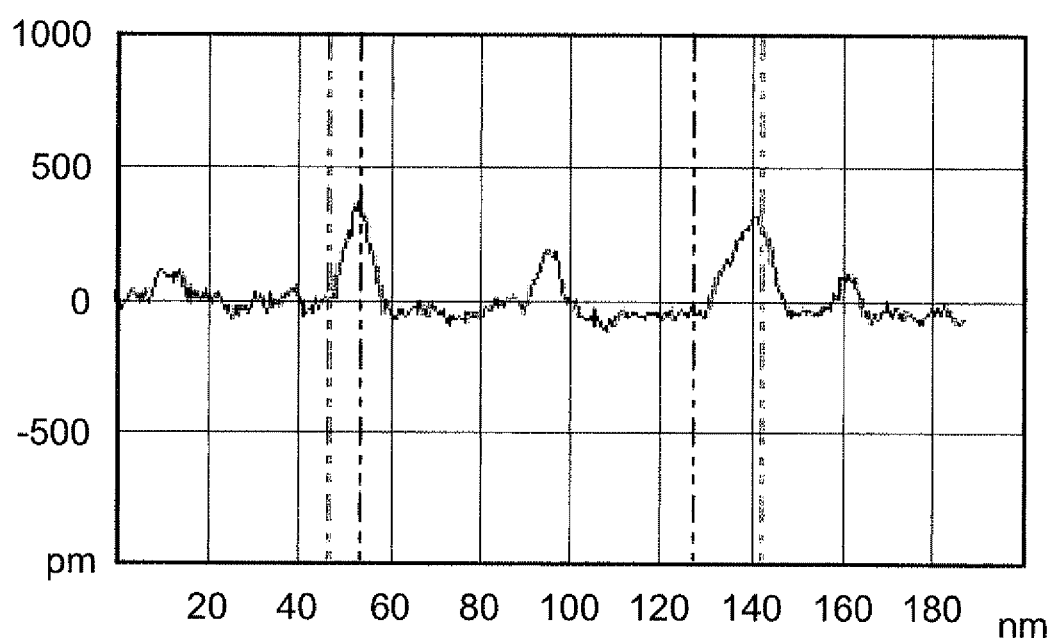
FIG. 12B is a graph showing a cross-sectional shape of the portion indicated by the straight line in FIG. 12A.

Projecting portions in the graph of FIG. 12B indicate plate-like graphite particles constituting the fine graphite particles, and the height of the projecting portions corresponds to the thickness of the plate-like graphite particles. As is apparent from the results shown in FIG. 12B, the thickness of the plate-like graphite particles was approximately 0.34 nm, which is equal to the thickness of single layer graphene. In other words, it was found that the fine graphite particles contained in the graphite particle-dispersed liquid obtained in Example 1 comprises plate-like graphite particles exfoliated to a single graphite sheet.

Example 34

Preparation of Fine Graphite Particles 18 g of styrene (ST), 2 g of 2-vinylpyridine (2VP), 50 mg of azobisisobutyronitrile, and 100 ml of toluene were mixed, and a polymerization reaction was carried out under a nitrogen atmosphere at 85° C. for 6 hours. After cooling, purification was performed by reprecipitation using chloroform-hexane, followed by vacuum drying. Thus, 3.3 g of an ST-2VP (9:1) random copolymer (Mn=25000) was obtained.

A graphite particle-dispersed liquid was obtained in the same manner as in Example 1, except that 20 mg of this ST-2VP (9:1) random copolymer was used instead of the ST-DMMAA (35:65) random copolymer. The graphite particle-dispersed liquid was allowed to stand still for 24 hours, and then visually observed. As a result, the graphite particles were not precipitated, and the obtained dispersion liquid was excellent in dispersion stability. Moreover, the fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Alkylation of Fine Graphite Particles 4.59 g of a terminal-hydroxyl group-containing polyolefin ("Epol®" manufactured by Idemitsu Kosan Company, Limited), 1.1 g of triphenylphosphine, and 40 ml of carbon tetrachloride were mixed, and heated under reflux for 12 hours with string under a nitrogen atmosphere at 80° C. Thus, a terminal-chlorinated polyolefin was synthesized. After the heating under reflux, the solution was evaporated, and then the terminal-chlorinated polyolefin was extracted with hexane. After that, purification was conducted by silica gel chromatography (solvent: hexane). Thus, 1.5 g of the terminal-chlorinated polyolefin (Mn=2000 (catalog value)) was obtained.

Next, 20 mg of this terminal-chlorinated polyolefin, 10 mg of the fine graphite particles, and 1 ml of toluene were mixed, and stirred under a nitrogen atmosphere at 100° C. for 6 hours. The obtained dispersion liquid was filtered, and the filter cake was washed with toluene. Thus, fine graphite particles treated with the terminal-chlorinated polyolefin were obtained. 2 mg of this fine graphite particles were dispersed in 1 ml of toluene or hexane, and dispersion states were visually observed immediately after the preparation and after standing for 1 day. Table 6 shows the results.

Example 35

0.61 g of an ST-DMAMA (9:1) random copolymer (Mn=32000) was obtained in the same manner as in Example 34, except that 0.2 g of 2-dimethylaminoethyl methacrylate (DMAMA) was used instead of the 2-vinylpyridine, the amount of styrene (ST) was changed to 1.8 g, the amount of azobisisobutyronitrile was changed to 8 mg, and the amount of toluene was changed to 10 ml.

A graphite particle-dispersed liquid was obtained in the same manner as in Example 1, except that 0.1 g of this ST-DMAMA (9:1) random copolymer was used instead of the ST-DMMAA (35:65) random copolymer, the amount of the graphite particles was changed to 1 g, the amount of the urea-hydrogen peroxide inclusion complex was changed to 1 g, and the amount of DMF was changed to 50 ml. The graphite particle-dispersed liquid was allowed to stand still for 24 hours, and then visually observed. As a result, the graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were obtained in the same manner as in Example 34, except that 10 mg of these fine graphite particles were used. 2 mg of the fine graphite particles were dispersed in 1 ml of toluene or hexane, and dispersion states were visually observed immediately after the preparation and after standing for 1 day. Table 6 shows the results.

Example 36

0.73 g of an ST-4VP (9:1) random copolymer (Mn=18000) was obtained in the same manner as in Example 35, except that 0.2 g of 4-vinylpyridine (4VP) was used instead of the 2-dimethylaminoethyl methacrylate, and the amount of toluene was changed to 7.5 ml.

A graphite particle-dispersed liquid was obtained in the same manner as in Example 1, except that 0.1 g of this ST-4VP (9:1) random copolymer was used instead of the ST-DMMAA (35:65) random copolymer. The graphite particle-dispersed liquid was allowed to stand still for 24 hours, and then visually observed. As a result, the graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were obtained in the same manner as in Example 34, except that 10 mg of these fine graphite particles were used. 2 mg of the fine graphite particles were dispersed in 1 ml of toluene or hexane, and dispersion states were visually observed immediately after the preparation and after standing for 1 day. Table 6 shows the results.

Example 37

Fine graphite particles treated with a chlorinated polypropylene were obtained in the same manner as in Example 34, except that 20 mg of a chlorinated polypropylene (manufactured by Aldrich, Mn=100000) was used instead of the terminal-chlorinated polyolefin. 2 mg of the fine graphite particles were dispersed in 1 ml of toluene or hexane, and dispersion states were visually observed immediately after the preparation and after standing for 1 day. Table 6 shows the results.

Example 38

Fine graphite particles treated with a maleic anhydride-modified polypropylene were obtained in the same manner as in Example 34, except that 20 mg of a maleic anhydride-modified polypropylene ("LICOCENE MA®" manufactured by Clariant, viscosity (140° C.)=300 mPa·s) was used instead of the terminal-chlorinated polyolefin. 2 mg of the fine graphite particles were dispersed in 1 ml of toluene or hexane, and dispersion states were visually observed immediately after the preparation and after standing for 1 day. Table 6 shows the results.

Example 39

A graphite particle-dispersed liquid was obtained by mixing 12.5 g of graphite particles ("EXP-P" manufactured by Nippon. Graphite Industries, ltd., particle diameters: 100 to 600 μm), 12.5 g of urea-hydrogen peroxide inclusion complex, 1.25 g of an ST-2VP (9:1) random copolymer prepared in the same manner as in Example 34, and 500 ml of DMF, and then subjecting the mixture to a wet grinding treatment 10 times under conditions of room temperature and a cylinder pressure of 200 MPa by using a wet type atomization unit ("STARBURST LAB" manufactured by SUGINO MACHINE LIMITED). The graphite particle-dispersed liquid was allowed to stand still for 24 hours, and then visually observed. As a result, the graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were obtained in the same manner as in Example 34, except that 10 mg of these fine graphite particles were used. 2 mg of the fine graphite particles were dispersed in 1 ml of toluene or hexane, and dispersion states were visually observed immediately after the preparation and after standing for 1 day. Table 6 shows the results.

Reference Example 1

25.6 g of an ST-PM (9:1) random copolymer (Mn=37000) was obtained in the same manner as in Example 34, except that 4 g of N-phenylmaleimide (PM) was used instead of the 2-vinylpyridine, the amount of styrene (ST) was changed to 36 g, the amount of azobisisobutyronitrile was changed to 100 mg, and the amount of toluene was changed to 50 ml.

A graphite particle-dispersed liquid was obtained in the same manner as in Example 1, except that 0.7 g of this ST-PM (9:1) random copolymer was used instead of the ST-DM-MAA (35:65) random copolymer, the amount of the graphite particles was changed to 7 g, the amount of the urea-hydrogen peroxide inclusion complex was changed to 7 g, and the amount of DMF was changed to 300 ml. The graphite particle-dispersed liquid was allowed to stand still for 24 hours, and then visually observed. As a result, the graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were obtained in the same manner as in Example 34, except that 10 mg of these fine graphite particles were used. 2 mg of the fine graphite particles were dispersed in 1 ml of toluene or hexane, and dispersion states were visually observed immediately after the preparation and after standing for 1 day. Table 6 shows the results.

group were treated with the polyolefin having a reactive moiety, the obtained fine graphite particles were excellent in dispersion stability in toluene. From these results, it was found that a polyolefin chain was introduced to the aromatic vinyl copolymer in the fine graphite particles. On the other hand, in the case (Reference Example 1) where the fine graphite particles comprising the aromatic vinyl copolymer having no amino group were treated with the polyolefin having a reactive moiety, neither dispersibility in toluene nor dispersibility in hexane was observed. This is presumably because no functional group such as an amino group was present in the aromatic vinyl copolymer in the fine graphite particles of Reference Example 1, and hence the reaction with the polyolefin having a reactive moiety did not proceed, so that the polyolefin chain was not introduced into the aromatic vinyl copolymer.

Moreover, in the cases (Examples 34 and 39) where the fine graphite particles comprising the aromatic vinyl copolymer containing the 2VP unit were treated with the terminal-chlorinated polyolefin, the obtained fine graphite particles were excellent in dispersion stability in hexane. On the other hand, in the cases (Examples 35 and 36) where the fine graphite particles comprising the aromatic vinyl copolymer containing the DMAMA unit or the 4VP unit were treated with the terminal-chlorinated polyolefin, it was found that although the fine graphite particles immediately after the preparation were excellent in dispersibility in hexane, the dispersion stability in hexane deteriorated. This is presumably because the terminal-chlorinated polyolefin was less reactive with the DMAMA unit and the 4VP unit than with the 2VP unit, so that the amount of the polyolefin chain introduced was decreased, and that the effect of shielding the steric polar group was small, even when the terminal-chlorinated polyolefin was bonded. Moreover, in the cases (Examples 37 and 38) where the fine graphite particles comprising the aromatic vinyl copolymer containing the 2VP unit were treated with the chlorinated polypropylene or the maleic anhydride-modified polypropylene, it was found that although the fine graphite particles immediately after the preparation were excellent in dispersibility in hexane, the dispersion stability in hexane deteriorated. This is presumably because the chlorinated polypropylene and the maleic anhydride-modified polypro-

TABLE 6

| | Aromatic vinyl copolymer | Polyolefin | Dispersing treatment | Dispersibility in hexane | | Dispersibility in toluene | |
|---|---|---|---|---|---|---|---|
| | | | | Immediately after preparation | After one-day standing | Immediately after preparation | After one-day standing |
| Example 34 | ST-2VP (9:1) copolymer | Terminal-chlorinated polyolefin | Ultrasonic wave | Dispersed | Dispersed | Dispersed | Dispersed |
| Example 35 | ST-DMAMA (9:1) copolymer | Terminal-chlorinated polyolefin | Ultrasonic wave | Dispersed | Partially aggregated | Dispersed | Dispersed |
| Example 36 | ST-4VP (9:1) copolymer | Terminal-chlorinated polyolefin | Ultrasonic wave | Dispersed | Partially aggregated | Dispersed | Dispersed |
| Example 37 | ST-2VP (9:1) copolymer | Chlorinated polypropylene | Ultrasonic wave | Dispersed | Partially aggregated | Dispersed | Dispersed |
| Example 38 | ST-2VP (9:1) copolymer | Maleic anhydride-modified polypropylene | Ultrasonic wave | Dispersed | Partially aggregated | Dispersed | Dispersed |
| Example 39 | ST-2VP (9:1) copolymer | Terminal-chlorinated polyolefin | Wet grinding | Dispersed | Dispersed | Dispersed | Dispersed |
| Ref. Ex. 1 | ST-PM (9:1) copolymer | Terminal-chlorinated polyolefin | Ultrasonic wave | Immediately aggregated | — | Immediately aggregated | — |

As is apparent from the results shown in Table 6, in the cases (Example 34 to 39) where the fine graphite particles comprising the aromatic vinyl copolymer having an amino pylene each have the functional group at internal position of each of their molecules, and hence have lower reactivity with the 2VP unit than the terminal-chlorinated polyolefin having the functional group at a terminal of the molecule, so that the amount of the polyolefin chain introduced decreased. In addition, this is also presumably because the tacticity of the polypropylene moiety was so high that the solubility was poor.

INDUSTRIAL APPLICABILITY

As described above, according to the present invention, it is possible to obtain fine graphite particles which can be highly dispersed in a solvent or a resin, and which are excellent in dispersion stability. Moreover, it is possible to easily produce a dispersion excellent in dispersion stability by dispersing such fine graphite particles in a solvent or a resin. Further, since the graphite structure is retained in the fine graphite particles of the present invention, the intrinsic characteristics of graphite (for example, heat resistance, chemical resistance, mechanical strength, thermal conductivity, electrical conductivity, and lubricity) are not impaired, and the characteristics can be easily imparted to a resin.

Therefore, the fine graphite particles of the present invention are useful as a filler or the like capable of imparting heat resistance, chemical resistance, mechanical strength, thermal conductivity, electrical conductivity, lubricity, and the like.

The invention claimed is:

1. Fine graphite particles comprising:
   plate-like graphite particles having a surface to which at least one functional group selected from the group consisting of hydroxyl group, a carboxyl group, and an epoxy group is covalently bonded; and
   an aromatic vinyl copolymer which is adsorbed on the plate-like graphite particles via the functional group, and which contains a vinyl aromatic monomer unit represented by the following formula (1):

—(CH$_2$—CHX)—                   (1)

(in the formula (1), X represents a phenyl group, a naphthyl group, an anthracenyl group, or a pyrenyl group, provided that these groups may have each a substituent).

2. The fine graphite particles according to claim 1, wherein the aromatic vinyl copolymer comprises the vinyl aromatic monomer unit and another monomer unit derived from at least one monomer selected from the group consisting of (meth)acrylic acid, (meth)acrylates, (meth)acrylamides, vinylpyridines, maleic anhydride, and maleimides.

3. The fine graphite particles according claim 1, wherein the aromatic vinyl copolymer is a block copolymer.

4. The fine graphite particles according to claim 1, wherein the plate-like graphite particles have thicknesses of 0.3 to 1000 nm.

5. The fine graphite particles according to claim 1, wherein the functional group is bonded to 50% or less of all carbon atoms near a surface of the plate-like graphite particle.

6. The fine graphite particles according to claim 1, further comprising at least one hydrocarbon chain which is bonded to the aromatic vinyl copolymer, and which is selected from the group consisting of alkyl chains, oligoolefin chains, and polyolefin chains.

7. The fine graphite particles according to claim 6, wherein the aromatic vinyl copolymer has a functional group, and the hydrocarbon chain is formed by bonding between the functional group of the aromatic vinyl copolymer and at least one selected from alkyl compounds, oligoolefins, and polyolefins which each have a moiety reactive with the functional group of the aromatic vinyl copolymer.

8. The fine graphite particles according to claim 7, wherein the functional group of the aromatic vinyl copolymer is an amino group.

9. The fine graphite particles according to claim 7, wherein the moiety reactive with the functional group of the aromatic vinyl copolymer is at least one selected from the group consisting of a chlorine atom, a carboxyl group, and a carboxylic anhydride group.

10. A graphite particle-dispersed liquid comprising:
    a solvent; and
    the fine graphite particles according claim 1 dispersed in the solvent.

11. The graphite particle-dispersed liquid according to claim 10, wherein
    the solvent is a hydrophobic solvent, and
    the fine graphite particles further comprise at least one hydrocarbon chain which is bonded to the aromatic vinyl copolymer, and which is selected from the group consisting of alkyl chains, oligoolefin chains, and polyolefin chains.

12. A method for producing fine graphite particles, comprising:
    a mixing step of mixing graphite particles, an aromatic vinyl copolymer, a peroxyhydrate and a solvent, the aromatic vinyl copolymer containing a vinyl aromatic monomer unit represented by the following formula (1):

—(CH$_2$—CHX)—                     (1)

(in the formula (1), X represents a phenyl group, a naphthyl group, an anthracenyl group, or a pyrenyl group, provided that these groups may have each a substituent); and
    a grinding step of subjecting the mixture obtained in the mixing step to a grinding treatment, to thereby obtain fine graphite particles according to claim 1.

13. The method for producing fine graphite particles according to claim 12, wherein
    the peroxyhydrate is a complex of hydrogen peroxide with a compound having a carbonyl group.

14. The method for producing fine graphite particles according to claim 12, wherein
    the grinding treatment is an ultrasonic wave treatment or a wet grinding treatment.

15. The method for producing fine graphite particles according to claim 12, wherein
    the aromatic vinyl copolymer has a functional group, and
    the method further comprises a hydrocarbon chain introduction step of mixing the fine graphite particles obtained in the grinding step with at least one selected from alkyl compounds, oligoolefins, and polyolefins which each have a moiety reactive with the functional group of the aromatic vinyl copolymer, and bonding between the aromatic vinyl copolymer and at least one selected from the alkyl compounds, the oligoolefins, and the polyolefins, to thereby introduce at least one selected from the group consisting of alkyl chains, oligoolefin chains, and polyolefin chains to thereby obtain fine graphite particles comprising:
    plate-like graphite particles having a surface to which at least one functional group selected from group consisting of a hydroxyl group, a carboxyl group, and an epoxy group is covalently bonded; and
    an aromatic vinyl copolymer which is adsorbed on the plate-like graphite particles via the functional group, and which contains a vinyl aromatic monomer unit represented by the following formula (1):

—(CH$_2$—CHX)—                     (1)

(in the formula (1), X represents a phenyl group, a naphthyl group, an anthracenyl group, or a pyrenyl group, provided that these groups may have each a substituent), wherein the fine graphite particles further comprise at least one hydrocarbon chain which is bonded to the aromatic vinyl copolymer, and which is selected from the group consisting of alkyl chains, oligoolefin chains, and polyolefin chains.

16. The method for producing fine graphite particles according to claim 15, wherein
the functional group of the aromatic vinyl copolymer is an amino group.

* * * * *